United States Patent
Allan

(10) Patent No.: US 11,128,576 B2
(45) Date of Patent: *Sep. 21, 2021

(54) METHOD AND SYSTEM FOR COMPLETING LOOSELY SPECIFIED MDTS

(71) Applicant: Telefonaktiebolaget LM Ericsson (publ), Stockholm (SE)

(72) Inventor: David Ian Allan, San Jose, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/136,990

(22) Filed: Sep. 20, 2018

(65) Prior Publication Data
US 2019/0020598 A1 Jan. 17, 2019

Related U.S. Application Data

(63) Continuation of application No. 14/952,856, filed on Nov. 25, 2015, now Pat. No. 10,164,907.

(51) Int. Cl.
*H04L 12/44* (2006.01)
*H04L 12/723* (2013.01)
(Continued)

(52) U.S. Cl.
CPC .......... *H04L 49/201* (2013.01); *H04L 45/16* (2013.01); *H04L 45/18* (2013.01); *H04L 12/18* (2013.01);
(Continued)

(58) Field of Classification Search
CPC ......... H04L 12/18; H04L 45/16; H04L 45/50; H04L 49/201
(Continued)

(56) References Cited

U.S. PATENT DOCUMENTS 6,778,531 B1 8/2004 Kodialam et al.
6,798,739 B1 * 9/2004 Lee .................... H04L 45/02
370/216
(Continued)

FOREIGN PATENT DOCUMENTS

CN 102142970 B 12/2013
EP 2940938 A1 11/2015
(Continued)

OTHER PUBLICATIONS

Allen, D., et al., "802.1aq and 802.1Qbp Support over EVPN; draft-allan-12vpn-spbm-evpn-00.txt," IETF, Standard Working Draft, ISOC, Jul. 9, 2012, pp. 1-11.
(Continued)

*Primary Examiner* — Syed Ali
*Assistant Examiner* — Jason A Harley
(74) *Attorney, Agent, or Firm* — Nicholson, De Vos, Webster & Elliott, LLP

(57) ABSTRACT

A method is implemented by a networking device functioning as a computing node. The method resolves sub-trees of a loosely specified multicast distribution tree (MDT). The method utilizes global identifiers for sub-trees of the MDT to enable differentiation of traffic destined for different sub-trees of the MDT at shared replication nodes. The method can be implemented at or for each of the nodes of the network that are part of the MDT.

22 Claims, 11 Drawing Sheets

(51) Int. Cl.
*H04L 12/721* (2013.01)
*H04W 40/00* (2009.01)
*H04L 12/931* (2013.01)
*H04L 12/761* (2013.01)
*H04L 12/705* (2013.01)
H04L 12/18 (2006.01)
H04L 12/707 (2013.01)
H04L 12/753 (2013.01)

(52) U.S. Cl.
CPC .............. *H04L 45/24* (2013.01); *H04L 45/48* (2013.01); *H04L 45/50* (2013.01)

(58) Field of Classification Search
USPC .................................................. 370/390, 351
See application file for complete search history.

(56) References Cited

U.S. PATENT DOCUMENTS

| | | | |
|---|---|---|---|
| 6,857,012 | B2 | 2/2005 | Sim et al. |
| 7,310,335 | B1 | 12/2007 | Garcia-Luna-Aceves et al. |
| 7,830,787 | B1 | 11/2010 | Wijnands et al. |
| 8,005,081 | B2 | 8/2011 | Bragg et al. |
| 8,121,056 | B1 | 2/2012 | Aggarwal et al. |
| 8,223,668 | B2 | 7/2012 | Allan et al. |
| 8,307,422 | B2 | 11/2012 | Varadhan et al. |
| 8,310,957 | B1 | 11/2012 | Rekhter et al. |
| 8,488,603 | B2 | 7/2013 | Zha et al. |
| 8,611,359 | B1 | 12/2013 | Kompella et al. |
| 8,811,388 | B2 | 8/2014 | Fedyk |
| 8,867,367 | B2 | 10/2014 | Allan |
| 8,953,590 | B1 | 2/2015 | Aggarwal et al. |
| 9,112,848 | B2 | 8/2015 | Allan |
| 9,430,262 | B1 | 8/2016 | Felstaine et al. |
| 9,794,148 | B1 | 10/2017 | Ramachandran et al. |
| 9,954,765 | B2 | 4/2018 | Allan |
| 10,069,639 | B2 | 9/2018 | Bragg |
| 2002/0186433 | A1* | 12/2002 | Mishra ................ H04J 14/0241 398/82 |
| 2003/0085931 | A1 | 5/2003 | Card et al. |
| 2003/0176931 | A1* | 9/2003 | Pednault .............. G06K 9/6219 700/31 |
| 2004/0037275 | A1* | 2/2004 | Li .......................... H04L 45/50 370/370 |
| 2005/0078656 | A1* | 4/2005 | Bryant .................. H04L 45/123 370/351 |
| 2005/0243722 | A1* | 11/2005 | Liu ........................ H04L 47/10 370/235 |
| 2006/0215588 | A1* | 9/2006 | Yoon .................... H04W 40/10 370/310 |
| 2006/0221867 | A1 | 10/2006 | Wijnands et al. |
| 2006/0268871 | A1* | 11/2006 | Van Zijst ............ H04L 12/1836 370/390 |
| 2007/0133568 | A1 | 6/2007 | Qing et al. |
| 2007/0140107 | A1 | 6/2007 | Eckert et al. |
| 2007/0147372 | A1 | 6/2007 | Liu et al. |
| 2007/0171851 | A1 | 7/2007 | Beckmann et al. |
| 2007/0189193 | A1 | 8/2007 | Previdi et al. |
| 2008/0144644 | A1 | 6/2008 | Allan et al. |
| 2008/0279101 | A1 | 11/2008 | Wu et al. |
| 2008/0298360 | A1* | 12/2008 | Wijnands ................ H04L 45/50 370/389 |
| 2009/0201803 | A1 | 8/2009 | Filsfils et al. |
| 2009/0245255 | A1* | 10/2009 | Cao ........................ H04L 45/00 370/390 |
| 2009/0310538 | A1 | 12/2009 | Lee et al. |
| 2010/0002697 | A1* | 1/2010 | Krishnan ............ H04L 12/1836 370/390 |
| 2010/0020797 | A1 | 1/2010 | Casey et al. |
| 2010/0281106 | A1 | 11/2010 | Ashwood-Smith |
| 2010/0316056 | A1 | 12/2010 | Unbehagen et al. |
| 2011/0170403 | A1 | 7/2011 | Ashwood-Smith et al. |
| 2011/0202761 | A1 | 8/2011 | Sarela et al. |
| 2011/0228780 | A1 | 9/2011 | Ashwood-Smith et al. |
| 2011/0273980 | A1 | 11/2011 | Ashwood |
| 2011/0299427 | A1 | 12/2011 | Chu et al. |
| 2011/0305239 | A1 | 12/2011 | Chandrashekharachar |
| 2012/0063451 | A1 | 3/2012 | Keesara et al. |
| 2012/0063465 | A1 | 3/2012 | Keesara et al. |
| 2012/0075988 | A1 | 3/2012 | Lu et al. |
| 2012/0106347 | A1 | 5/2012 | Allan et al. |
| 2012/0147885 | A1 | 6/2012 | Johri et al. |
| 2012/0177041 | A1 | 7/2012 | Berman |
| 2012/0177042 | A1 | 7/2012 | Berman |
| 2012/0177043 | A1 | 7/2012 | Berman |
| 2012/0201539 | A1 | 8/2012 | Boertjes et al. |
| 2012/0233350 | A1 | 9/2012 | Unbehagen et al. |
| 2012/0300774 | A1 | 11/2012 | Casey et al. |
| 2013/0010790 | A1 | 1/2013 | Shao |
| 2013/0114466 | A1 | 5/2013 | Koponen et al. |
| 2013/0114595 | A1 | 5/2013 | Mack-Crane et al. |
| 2013/0142511 | A1 | 6/2013 | Spraggs et al. |
| 2013/0195111 | A1 | 8/2013 | Allan et al. |
| 2013/0259046 | A1 | 10/2013 | Ramesh |
| 2014/0036913 | A1 | 2/2014 | Olofsson et al. |
| 2014/0064063 | A1 | 3/2014 | Holness et al. |
| 2014/0086097 | A1 | 3/2014 | Qu et al. |
| 2014/0092898 | A1 | 4/2014 | Berman |
| 2014/0112188 | A1 | 4/2014 | Keesara et al. |
| 2014/0126422 | A1 | 5/2014 | Bragg |
| 2014/0211797 | A1 | 7/2014 | Luo et al. |
| 2014/0226525 | A1* | 8/2014 | Eastlake, III ........... H04L 41/12 370/254 |
| 2014/0241351 | A1 | 8/2014 | Kollipara et al. |
| 2014/0241352 | A1 | 8/2014 | Kollipara et al. |
| 2014/0254592 | A1 | 9/2014 | Olofsson et al. |
| 2014/0376366 | A1* | 12/2014 | Li .......................... H04L 45/124 370/230 |
| 2015/0156106 | A1 | 6/2015 | Allan |
| 2015/0188771 | A1 | 7/2015 | Allan et al. |
| 2015/0319007 | A1 | 11/2015 | Allan |
| 2015/0358226 | A1 | 12/2015 | Liu |
| 2016/0028625 | A1* | 1/2016 | Hari ........................ H04L 45/74 370/392 |
| 2016/0277291 | A1 | 9/2016 | Lakshmikanthan et al. |
| 2016/0308793 | A1 | 10/2016 | Levy-Abegnoli et al. |
| 2017/0012880 | A1 | 1/2017 | Yang |
| 2017/0078188 | A1 | 3/2017 | Allan |
| 2017/0093612 | A1 | 3/2017 | Singh et al. |
| 2017/0093689 | A1 | 3/2017 | Manur et al. |
| 2018/0324090 | A1 | 11/2018 | Duncan et al. |
| 2019/0116053 | A1 | 4/2019 | Allan |
| 2020/0044957 | A1 | 2/2020 | Allan |

FOREIGN PATENT DOCUMENTS

| | | |
|---|---|---|
| WO | 2014139564 A1 | 9/2014 |
| WO | 2017118941 A1 | 7/2017 |
| WO | 2017144943 A1 | 8/2017 |
| WO | 2017144944 A1 | 8/2017 |
| WO | 2017144945 A1 | 8/2017 |
| WO | 2017144946 A1 | 8/2017 |
| WO | 2017144947 A1 | 8/2017 |
| WO | 2017168203 A1 | 10/2017 |
| WO | 2017168204 A1 | 10/2017 |

OTHER PUBLICATIONS

Non-Final Office Action from U.S. Appl. No. 14/850,787, dated Mar. 20, 2019, 35 pages.
Aggarwal, et al. "BGP MPLS Based Ethernet VPN, draft-raggarwa-sajassi-l2vpn-evpn-04.txt", Internet Engineering Task Force (IETF), Network Working Group, Internet-Draft, Sep. 12, 2011, 43 pages.
Aggarwal, et al., "BGP Encodings and Procedures for Multicast in MPLS/BGP IP VPNs," BGP Encodings and Procedures for Multicast in MPLS/BGP IP VPNS; RFC6514; Internet Engineering Task Force; IETF, 2012, pp. 1-59.
Allan, et al., "Shortest Path Bridging, MAC Mode Support over EVPN, draft-ietf-bess-spbm-evpn-02," Internet Engineering Task

(56) References Cited

OTHER PUBLICATIONS

Force (IETF), BESS Working Group, Internet-Draft, Oct. 2015, 11 pages.
Allen, et al., "A Framework for Computed Multicast applied to MPLS based Segment: draft-allan-spring-mplsmulticast-framework-OO.txt," SPRING Working Group, Feb. 23, 2016, pp. 1-13.
Bhaskar, et al., "Bootstrap Router (BSR) Mechanism for Protocol Independent Multicast (PIM); rfc5059.txt," JCT-VC Meeting; MPEG Meeting; Mar. 16, 2011-Mar. 23, 2011; Geneva; (Joint Collaboartive Team on Video Coding of ISO/IEC JTC1/SC29/WG11 and ITU-T SG.16); URL: http://wftp3.itu.int/av-arch/jctvc-site, Internet Engineering Task Force, IETF, Jan. 1, 2008, XP015055131, ISSN: 0000-0003, 2 pages.
BOUDANI, et al., "An Effective Solution for Multicast Scalability: The MPLS Multicast Tree (MMT)—draft-boudani-mpls-multicast-tree-06.txt," Internet Draft, Oct. 2004, 21 pages.
Cheng, et al., "IGP Multicast Architecture," draft-yong-pim-igp-multicast-arch-01, IETF, Mar. 9, 2015, pp. 1-15.
Dalal, et al., "Reverse Path Forwarding of Broadcast Packets," Communications of the ACM, Dec. 1978, vol. 21 (12), pp. 1040-1048.
Farkas, et al., "IS-IS Path Computation and Reservation, draft-ietf-isis-pcr-02," Internet Engineering Task Force (IETF), IS-IS for IP Internets, Internet-Draft, Sep. 18, 2015, 32 pages.
Filsfils, et al.,"Segment Routing Architecture," draft-ietf-spring-segment-routing-07.txt, IETF, ISOC, Dec. 15, 2015, pp. 1-24.
Filsfils, et al., "Segment Routing with MPLS data plane, draft-ietf-spring-segment-routing-mpls-01," Network Working Group, Internet-Draft, May 29, 2015, 14 pages.
Filsfils, et al., "Segment Routing with MPLS data plane, draft-ietf-spring-segment-routing-mpls-02," Network Working Group, Internet-Draft, Oct. 17, 2015, 14 pages.
Filsfils, et al., "Interconnecting Millions of Endpoints With Segment Routing, draft-filsfils-spring-large-scale-interconnect-00," Internet Engineering Task Force (IETF), IETF Trust, Network Working Group, Internet-Draft, Jul. 19, 2015, 10 pages.
Hao, et al., "IGP Multicast Architecture," draft-yong-rtgwg-igp-multicast-arch-01.txt, IETF, ISOC, Nov. 2014, pp. 1-14.
IEEE P802.1aq/D4.6, Draft Standard for Local and Metropolitan Area Networks, Media Access Control (MAC) Bridges and Virtual Bridged Local Area Networks—Amendment XX: Shortest Path Bridging, Feb. 10, 2012, 363 pages.
IEEE Std 802.1Qca/D2.1: "Draft Standard for Local and Metropolitan Area Networks—Bridges and Bridged Networks—Amendment: Path Control and Reservation," IEEE Computer Society, Jun. 23, 2015, 114 pages.
Kini, et al., "Entropy labels for source routed stacked tunnels, draft-ietf-mpls-spring-entropy-label-00," Internet Engineering Task Force (IETF), Network Working Group, Internet-Draft, Mar. 5, 2015, 12 pages.
Li, et al., "Merging Source and Shared Trees Multicast in MPLS Networks," PDCAT, Seventh International Conference, Dec. 1, 2006, pp. 23-28.
Media Access Control (MAC) Bridges and Virtual Bridged Local Area Networks Amendment 20: Shortest Path Bridging, IEEE Standard for Local and metropolitan area networks, IEEE Computer Society, IEEE Std 802.1 aq, New York, NY., Jun. 29, 2012, 340 pages.
Previdi, et al., "SPRING Problem Statement and Requirements," draft-ietf-spring-problem-statement-07.txt, IETF, ISOC, Mar. 1, 2016, pp. 1-18.
Rabadan, et al., "Usage and applicability of BGP MPLS based Ethernet VPN—draft-ietf-bess-evpn-usage-01.txt," Internet Engineering Task Force (IETF), Internet Society, Jul. 4, 2015, 30 pages.
RFC 3031: Rosen, et al., "Multiprotocol Label Switching Architecture," Jan. 2001, 61 pages, Request for Comments: 3031.
RFC 3209: Awduche, et al., "RSVP-TE: Extensions to RSVP for LSP Tunnels," Network Working Group, The Internet Society, Request for Comments: 3209, Dec. 2001, 61 pages.

RFC 3353: Ooms, et al., "Overview of IP Multicast in a Multi-Protocol Label Switching (MPLS) Environment," Request for Comments: 3353, Aug. 2002, 30 pages.
RFC 3813: Srinivasan, et al., "Multiprotocol Label Switching (MPLS) Label Switching Router (LSR) Management Information Base (MIB)," Request for Comments: 3813, Jun. 2004, 60 pages.
RFC 4364: Rosen, et al., "BGP/MPLS IP Virtual Private Networks (VPNs)," Feb. 2006, 47 pages, The Internet Society, Network Working Group, Request for Comments: 4364.
RFC 5015: Handley, et al., "Bidirectional Protocol Independent Multicast (BIDIR-PIM)," Network Working Group, Request for Comments: 5015, Oct. 2007, 43 pages.
RFC 5036: Andersson L., "LDP Specification," The EITF Trust, Network Working Group, Request for Comments: 5036, Oct. 2007, 135 pages.
RFC 6329: Fedyk, et al., "IS-IS Extensions Supporting IEEE 802.1aq Shortest Path Bridging," Internet Engineering Task Force (IETF), Request for Comments: 6329, Apr. 2012, 38 pages.
RFC 6388: Wijnands, et al. "Label Distribution Protocol Extensions for Point-to-Multipoint and Multipoint-to-Multipoint Label Switched Paths," Internet Engineering Task Force (IETF), Request for Comments: 6388, Nov. 2011, 39 pages.
RFC 6826: Wijnands, et al., "Multipoint LDP In-Band Signaling for Point-to-Multipoint and Multipoint-to-Multipoint Label Switched Paths," Internet Engineering Task Force (IETF), Request for Comments: 6826, Jan. 2013, 12 pages.
RFC 7734: Allan, et al., "Support for Shortest Path Bridging MAC Mode over Ethernet VPN (EVPN)," Internet Engineering Task Force (IETF), Request for Comments: 7734, IETF Trust, Jan. 2016, 11 pages.
Sajassi, et al., "PBB E-VPN, draft-sajassi-12vpn-pbb-evpn-03.txt," Internet Engineering Task Force (IETF), Network Working Group, Internet-Draft, Oct. 28, 2011, 25 pages.
Aggarwal, et al., "BGP MPLS Based Ethernet VPN, draft-ietf-12vpn-evpn-00," IETF Network Working Group Internet Draft, Feb. 24, 2012, pp. 1-39.
Allan, et al., "802.1aq and 802.1Qbp Support over EVPN; draft-allan-12vpn-spbm-evpn-00.txt," IETF, Standard Working Draft, ISOC, Jul. 9, 2012, pp. 1-11.
Allan, et al., "A Framework for Computed Multicast applied to MPLS based Segment Routing; draft-allan-spring-mpls-multicast-framework-00," SPRING Working Group, IETF, Feb. 23, 2016, pp. 1-13.
Filsfils, et al., "Interconnecting Millions of Endpoints With Segment Routing, draft-filsfils-spring-large-scale-interconnect-01," Internet Engineering Task Force (IETF), IETF Trust, Network Working Group, Internet-Draft, Nov. 1, 2015, 11 pages.
IEEE Std 802.1ad-2005: "IEEE Standard for Local and Metropolitan Area Networks—Virtual Bridged Local Area Networks—Amendment 4: Provider Bridges," IEEE Computer Society, May 26, 2006, pp. 1-74.
IEEE Std 802.1ah-2008: "IEEE Standard for Local and metropolitan area networks—Virtual Bridged Local Area Networks; Amendment 7: Provider Backbone Bridges," IEEE Computer Society, Aug. 14, 2008, pp. 1-121.
Sajassi, et.al., "PBB E-VPN; draft-ietf-12vpn-pbb-evpn-02," IETF Trust, Internet Working Group, Internet Draft, Mar. 29, 2012, pp. 1-27.
Singh, D., "Yet another blog about Segment Routing—Part 1," Packet Pushers Interactive, LLC, Blog, Apr. 27, 2015, pp. 1-11.
Wikipedia, "Multiprotocol Label Switching," Nov. 6, 2017, pp. 1-7.
Wikipedia, "Tunneling protocol," Apr. 28, 2018, pp. 1-4.
Wikipedia, "Unicast," Sep. 11, 2017, 2 pages.
Yong, et al., "IGP Multicast Architecture; draft-yong-pim-igp-multicast-arch-01.txt," IGP Multicast Architecture, IETF, Mar. 9, 2015, pp. 1-15.
Yong, et al., "IGP Multicast Architecture; draft-yong-rtgwg-igp-multicast-arch-01.txt," IETF, Nov. 10, 2014, pp. 5-8.
Lei et al., "DMMP: Dynamic Mesh-based Overlay Multicast Protocol, draft-lei-samrg-dmmp-03.txt", Network Working Group, Internet-Draft, Feb. 22, 2008, pp. 1-30.

* cited by examiner

METHOD AND SYSTEM FOR COMPLETING LOOSELY SPECIFIED MDTS

CROSS-REFERENCE TO RELATED APPLICATIONS

This application is a continuation of application Ser. No. 14/952,856, filed Nov. 25, 2015 (now U.S. Pat. No. 10,164,907 issued Dec. 25, 2018), which is hereby incorporated by reference.

FIELD

Embodiments of the invention relate to the field of multicast routing. In particular, the embodiments relate to a process for handling the determination of multicast distribution trees (MDTs) that have been loosely specified, in a manner that is efficient and is resilient against looping even when topology changes conflict with the loose specification of the tree.

BACKGROUND

Numerous techniques and protocols exist for configuring networks to handle multicast traffic. For Internet Protocol (IP) and/or multiprotocol label switching (MPLS) implementations the existing solutions for multicast are based on multicast label distribution protocol (mLDP) or protocol independent multicast (PIM). These are all techniques that depend on a unicast shortest path first (SPF) computation followed by handshaking between peers to sort out a loop free multicast distribution tree (MDT) for each multicast source. At the same time numerous protocols exist that provide for unicast tunneling, and some (such as label based architectures like source packet routing in networking (SPRING) or MPLS-LDP) implement a full mesh of unicast tunnels as an artifact for normal operation.

SPB is a networking system for the configuration of computer networks that enables multipath routing. In one embodiment, the protocol is specified by the Institute of Electrical and Electronics Engineers (IEEE) 802.1aq standard. This networking system utilized a link state routing system as a replacement for prior standards such as spanning tree protocols. SPB enables all paths in the computing network to be active with multiple equal costs paths being utilized through load sharing and similar technologies. The standard enables the implementation of logical Ethernet networks in Ethernet infrastructures using a link state protocol to advertise the topology and logical network memberships of the nodes in the network. SPB implements large scale multicast as part of implementing virtualized broadcast domains.

Proposals have been made to use global identifiers in the dataplane combined with the IEEE 802.1aq technique of advertising multicast registrations in the interior gateway protocol (IGP) and using an "all pairs shortest path" computation to compute MDTs without the additional handshaking of existing multicast protocols.

SPRING is an exemplary profile of the use of MPLS technology whereby global identifiers are used in the form of a global label assigned to each label switched router (LSR) that is used for forwarding to that LSR. A full mesh of unicast tunnels is constructed via every node in the network computing the shortest path to every other node and installing the associated global labels accordingly. In the case of SPRING, this also allows explicit paths to be set up via the application of label stacks at the network ingress which specify the path that the packet should traverse expressed as a set of waypoints. Encompassed with this approach is the concept of a strict (every hop specified) or loose (some waypoints specified) route dependent on how exhaustively the ingress applied label stack specifies the path. SPRING, RSVP-TE and other technologies have a concept of loosely specified paths where only a portion of a path is specified and the network locally fills in the rest on the basis of local topology knowledge. It would be useful to have this capability for multicast trees.

mLDP and PIM do not have a facility to permit any engineering of multicast trees in that way points cannot be specified. Any resulting MDT simply follows the shortest path established by unicast convergence. RSVP-TE does have extensions that permit engineered trees to be specified, but this results in significant control plane traffic and state.

To combat some of these issues methods have been defined to implement engineered multicast forwarding. These methods utilize loosely specified trees. A loosely specified tree is one in which not every hop in the tree is specified, only some hops are specified as "way points." This results in a tree being defined as a cascade of sub-trees where the location of the sub-tree roots has been specified or "pinned." A sub-tree is a portion of the overall tree where an intermediate root and a set of leaves has been explicitly defined. As used herein a stage of an MDT refers to the set of sub-trees that are an equal number of cascaded subtrees from the root.

Pinning intermediate points in the MDTs where the hops are loose introduces some issues. The overall resulting tree cannot be guaranteed to be acyclic across topology changes. The resulting tree will not be optimal across topology changes. The result is that although it is desirable to be able to specify or 'pin' hops in a tree for engineering and traffic distribution purposes, it cannot be reliably done with a flat multicast tree with invariant identifiers if there is a combination of pinned points and computed portions of the MDT.

Methods have been introduced where unicast tunneling is used between a root, replication trees and leaves that implement each MDT to reduce the problems of loosely specified trees. However, these methods do not eliminate the possibility of acyclic trees in the presence of pinned waypoints as tunnel collisions such that they will not result in looping or duplication. However, a mix of pinned and computed trees may still present issues. In such a topology, changes in the topology may result in a single node resolving to being a replication tree for multiple sub trees of the overall tree. This can lead to problems in forwarding and congestion without a method of disambiguating the subtrees in the forwarding plane.

SUMMARY

In one embodiment, a method is implemented by a networking device functioning as a computing node. The method resolves sub-trees of a loosely specified multicast distribution tree (MDT). The method utilizes global identifiers for sub-trees of the MDT to enable differentiation of traffic destined for different sub-trees of the MDT at shared replication nodes. The method is implemented at each of the nodes of the network that are part of the MDT. The method includes selecting a sub-tree in a set of sub-trees in the MDT rooted at a current node within the MDT, computing the selected sub-tree completely from root to leaves, and generating a translation of sub-tree identifiers between the sub-tree identifiers of the selected sub-tree and a sub-tree identifier of an upstream sub-tree, in response to the computing node determining that the computing node is the current node and the sub-tree root of the selected sub-tree.

In another embodiment, a network device is configured to implement the method to resolve sub-trees of a loosely specified MDT. The method utilizes the global identifiers for sub-trees of the MDT to enable differentiation of traffic destined for different sub-trees of the MDT at shared replication nodes. The method is implemented at each of the nodes of the network that are part of the MDT. The network device includes a non-transitory machine-readable medium to store a sub-tree computation module, and a processor coupled to the non-transitory machine-readable medium to execute the sub-tree computation module. The sub-tree computation module is configured to select a next sub-tree in the set of sub-trees in the MDT rooted at a current node within the MDT, to compute the selected sub-tree completely from root to leaves, and to generate a translation of sub-tree identifiers between the sub-tree identifiers of the selected sub-tree and a sub-tree identifier of an upstream sub-tree, in response to the computing node determining that the computing node is the current node and the sub-tree root of the selected sub-tree.

In a further embodiment, a computing device is in communication with a network device in a network with a plurality of network devices. The computing device executes a plurality of virtual machines for implementing network function virtualization (NFV), wherein a virtual machine from the plurality of virtual machines is configured to implement a method to resolve sub-trees of a loosely specified MDT. The method utilizes the global identifiers for sub-trees to enable differentiation of traffic of different sub-trees at shared replication nodes. The method is implemented for each of the nodes of the network that are part of the MDT. The computing device includes a non-transitory machine-readable medium to store a sub-tree computation module, and a processor coupled to the non-transitory machine-readable medium to execute the sub-tree computation module. The sub-tree computation module is configured to select a next sub-tree in the set of sub-trees in the MDT rooted at a current node within the MDT, to compute the selected sub-tree completely from root to leaves, and to generate a translation of sub-tree identifiers between the sub-tree identifiers of the selected sub-tree and a sub-tree identifier of an upstream sub-tree, in response to the computing node determining that the computing node is functioning as the current node and the sub-tree root of the selected sub-tree.

In one embodiment, a control plane device is configured to implement a control plane of a software defined networking (SDN) network including a network device in a network with a plurality of network devices, wherein the control plane device is configured to implement a method to resolve sub-trees of a loosely specified MDT. The method is to utilize global identifiers for sub-trees of the MDT to enable differentiation of traffic destined for different sub-trees of the MDT at shared replication nodes. The method is implemented to configure each of the nodes of the network that are part of the MDT. The control plane device includes a non-transitory machine-readable medium to store a sub-tree computation module, and a processor coupled to the non-transitory machine-readable medium to execute the sub-tree computation module. The sub-tree computation module is configured to select a next sub-tree in the set of sub-trees in the MDT rooted at a current node within the MDT, to compute the selected sub-tree completely from root to leaves, and to generate a translation of sub-tree identifiers between the sub-tree identifiers of the selected sub-tree and a sub-tree identifier of an upstream sub-tree, in response to the computing node determining that the computing node is configuring the current node and the sub-tree root of the selected sub-tree.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
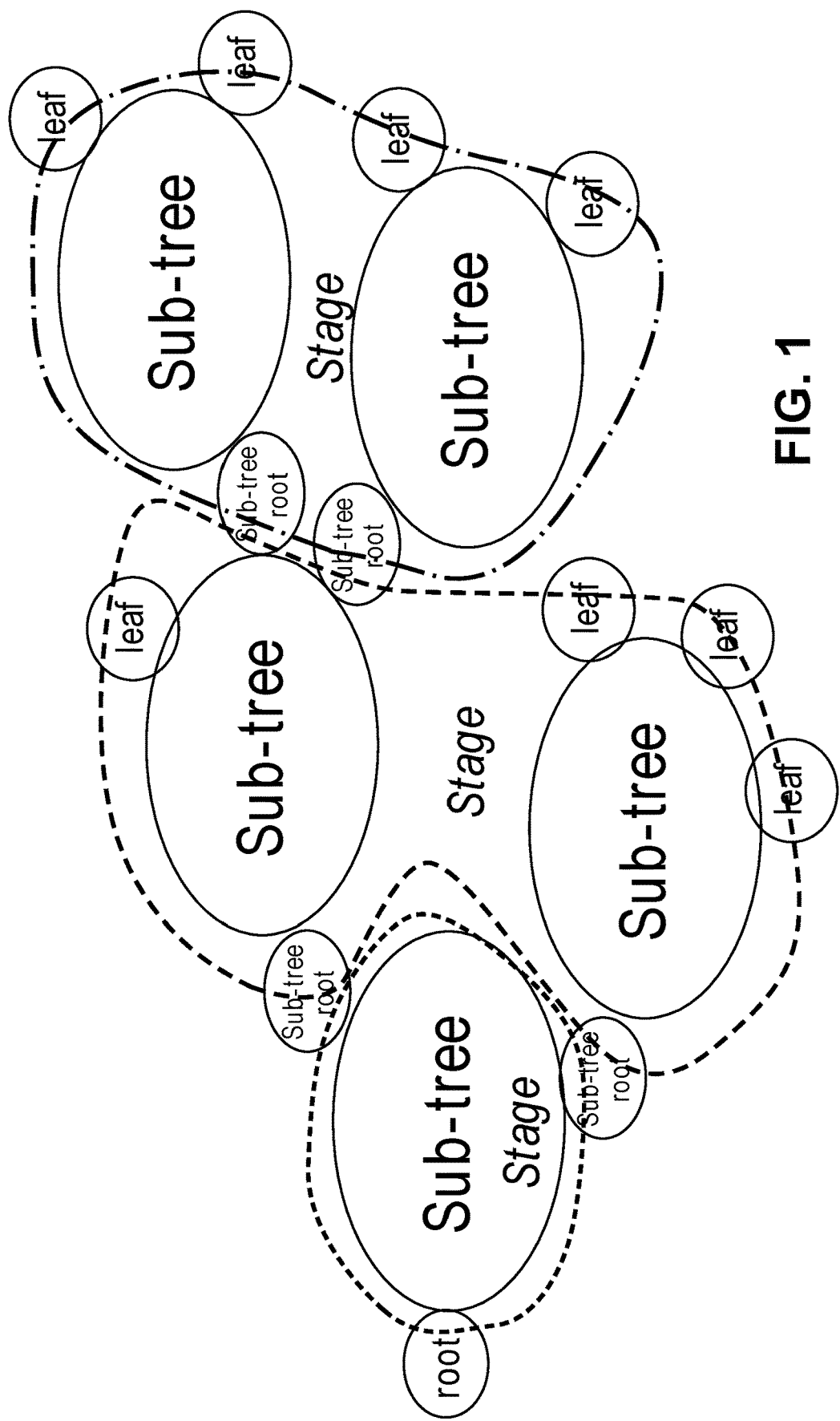
FIG. 1 is a diagram of one example network topology for a multicast distribution tree (MDT).

The following description describes methods and apparatus for computing loosely specified sub-trees of a multicast distribution tree. The methods and apparatus utilize a unique dataplane source, group (S, G) identifier for each pinned (i.e., specified) root or waypoint in the network or MDT and translating the received (S, G) identifier to a new identifier for the next sub-tree. Existing techniques will ensure that any individual sub-tree between pinned points and a set of leaves is acyclic and the translation of identifiers such that sub-trees can be disambiguated in the dataplane ensures that if a topology change results in an MDT that is acyclic, an actual forwarding loop will not form, nor will there be duplicate delivery of packets to any receivers. The sub-tree labels are global and the description of the subtree is disseminated in the control plane such that any node in the network has sufficient information to determine if it needs to install state for a given sub-tree, as it may be required to do as a result of needing to respond to arbitrary topology changes.

Thus the embodiments provide that subtrees are specified as a set of leaves and a root in the control plane just as a complete MDT would be and in addition these sub-trees are then stitched together to produce the overall MDT such that each sub-tree uses a unique identifier in the dataplane so that a non-acyclic overall tree is composed of acyclic components that can be disambiguated from each other.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Overview

FIG. 1 is a diagram of one embodiment of a MDT that has been loosely specified. The loosely specified MDT includes a root that is the ingress point for multicast traffic to be distributed by the MDT and a set of sub-trees that are a portion of the overall tree where an intermediate root is specified and where a set of leaves and/or further sub-tree roots are also specified. The sub-trees can be described as a set of stages. Each stage is a set of the sub-trees with an equal number of pinned hops (in the form of sub-tree roots) from the root. In FIG. 1, the root of the MDT is on the left hand side of the diagram and connected to a single sub-tree. However, a root can be connected to multiple sub-trees. The illustrated MDT is provided by way of example and not limitation, thus the MDT can have any size and organization of sub-trees and leaves. Similarly, the MDTs with any number of stages and any number of sub-trees can be specified.

The sub-tree directly connected to the root is the only sub-tree in stage one. This sub-tree has two replication nodes as leaves that serve as the roots of two separate sub-trees in the second stage. The sub-trees in the second stage have a set of leaves and one of the sub-trees has two replication trees that serve as sub-tree roots for the sub-trees of the third stage. Thus, any given sub-tree can serve an arbitrary number of downstream subtrees (including none). In the third stage of the example MDT there are no downstream replication trees. The two third stage sub-trees deliver multicast traffic exclusively to leaves. Similarly, a given sub-tree only includes a single root connect to single sub-tree in the preceding stage. However, though not illustrated in this example and likely not utilized in practice, one can envision that a single node can be the root for multiple sub-trees.

Thus, one of the issues of the prior art systems is the handling of traffic at nodes that are replication trees for multiple trees and for the handling of changes in topology. In other words, pinning intermediate points in an MDT where the hops are loose is problematic in the prior art in that the capability does not exist in multicast systems that use transactional convergence as there is no means of expressing way points and very state intensive for signaled systems. The resulting MDT cannot be guaranteed to be acyclic across topology changes. Although it is desirable to be able to pin hops in an MDT for engineering and traffic distribution purposes, it cannot be reliably done with a flat multicast tree with invariant identifiers if there are computed portions of the MDT.

Further, interactions between the computed and pinned portions of the MDT may cross producing either loops or duplication. Some methods may reduce but not eliminate the possibility of acyclic trees in the presence of pinned waypoints as tunnel collisions will not result in looping or duplication. In all cases however, where there is a mix of pinned and computed trees there may be problems when a topology change may result in a single node resolving to being a replication tree for multiple sub trees of the overall tree.

The MDT is implemented in the context and with the use of reservation resource reservation protocol—traffic engineering (RSVP-TE) signaled point to multipoint (P2MP) trees. The nodes of the topology label swap on every hop. The loosely specified MDTs are signaled (i.e., there is a head end, root, computation). Each root of the sub-trees is responsible for making the respective sub-tree acyclic. In some embodiments, routing in the MDT is determined via IEEE 802.1 aq Shortest Path Bridging, which provides some of the thinking and algorithms for the computed paths. IEEE 802.1Qca which permits the specification of MDTs in a link state routing system or aspects thereof is an exemplar of how loose trees can be expressed in a link state environment although it is not the only method of expressing a loosely pinned MDT in a control plane.

RSVP-TE has the ability to set up loose p2mp trees, but these are based on the node at the ingress to a loosely specified hop computing the tree at signaling setup. This can have resilience issues and is unable to leverage some of the optimizations available via some distributed computation models. Protocols used for MDT tree establishment are based on unicast convergence do not have this capability. It would be desirable to have this capability in combination with some multicast distribution models. IEEE 802.1Qca has demonstrated that the single interior gateway protocol (IGP) model can be extended into explicit trees. But if a distribution model uses a global label per (S,G) tree, which would not be guaranteed to produce an overall acyclic tree when combined with pinned waypoints. The embodiments provide a solution for the partitioning of a given MDT into sub-trees, and then separating them in the dataplane via the use of a global label per sub-tree to render collisions harmless.

The embodiments overcome the limitations of the prior art by providing a process and apparatus where for a given MDT with pinned points that is partitioned into a set of sub-trees, each of the sub-trees is assigned a global identifier such as a global label. As part of MDT computation, the stitching of labels between sub-trees is determined and installed, and each sub-tree computed as if it were a unique S,G tree. Each sub-tree itself is acyclic as a consequence of the algorithms used. Any collisions between sub-trees are rendered harmless as each is implemented as a unique (S,G) tree. The embodiments provide advantages over the prior art as they permit traffic engineered MDTs to be combined with computed MDTs to produce MDTs specified to any level of granularity. This can be accomplished using multiprotocol label switching (MPLS) technologies with no changes to the technology base.

Figure 2:
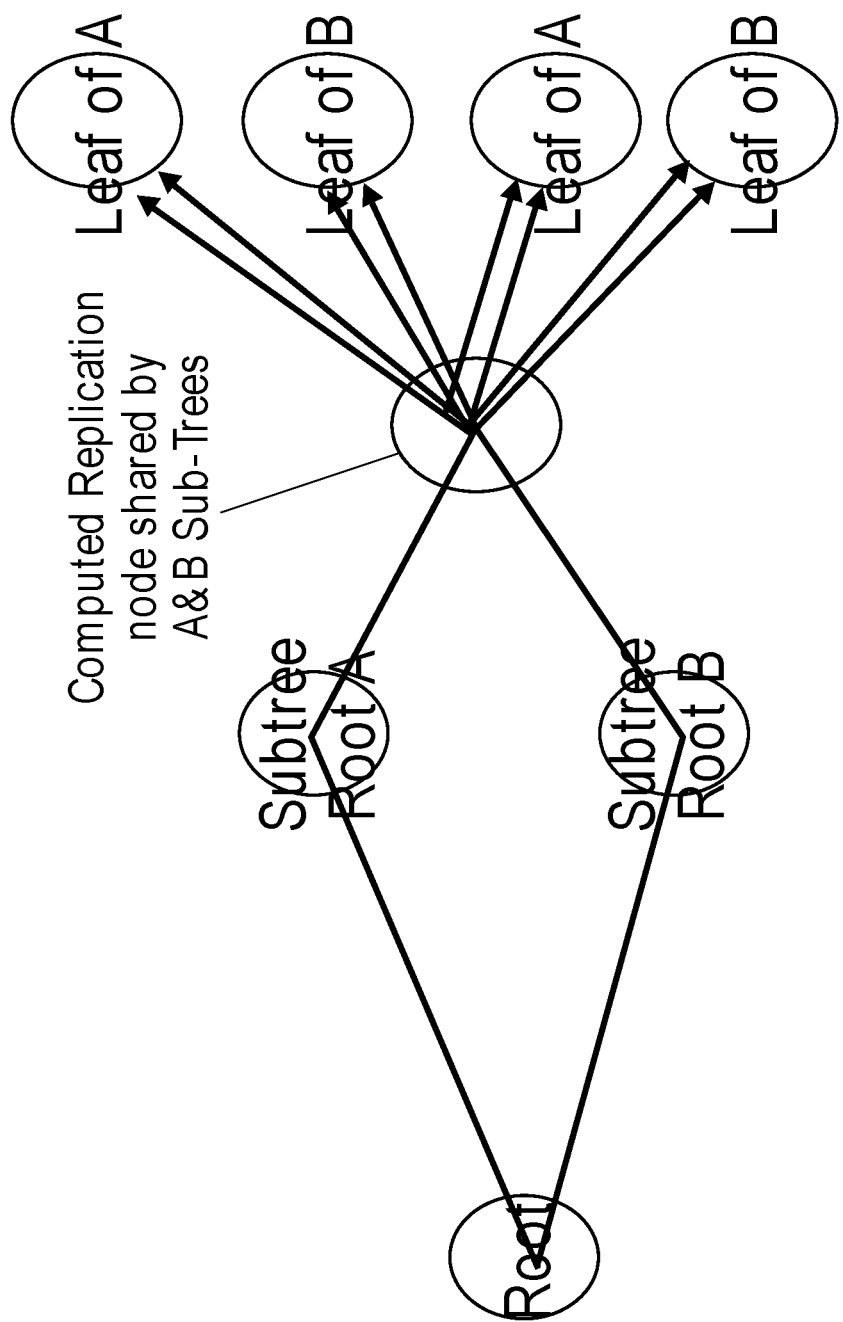
FIG. 2 is a diagram of one embodiment of a replication node for multiple sub-trees.

FIG. 2 is a diagram of one embodiment of a replication tree shared by multiple sub-trees. This diagram illustrates one of the issues of changes in topologies where a single node becomes a replication tree for multiple sub trees. In the diagram, the structure of the topology is simplified for sake of illustration. The root of the loosely defined MDT is connected with a set of sub-trees that include two replicating points that serve as the roots for two sub-trees A and B in subsequent stage of the MDT. Each of these sub-trees (A & B), however have come to share a replication node through which all of the leaves of the MDT are reachable. A non-cyclic tree such as this demonstrate that a replication tree can receive multiple copies of traffic and cannot determine the correct set of leaves for each received packet.

Figure 3:
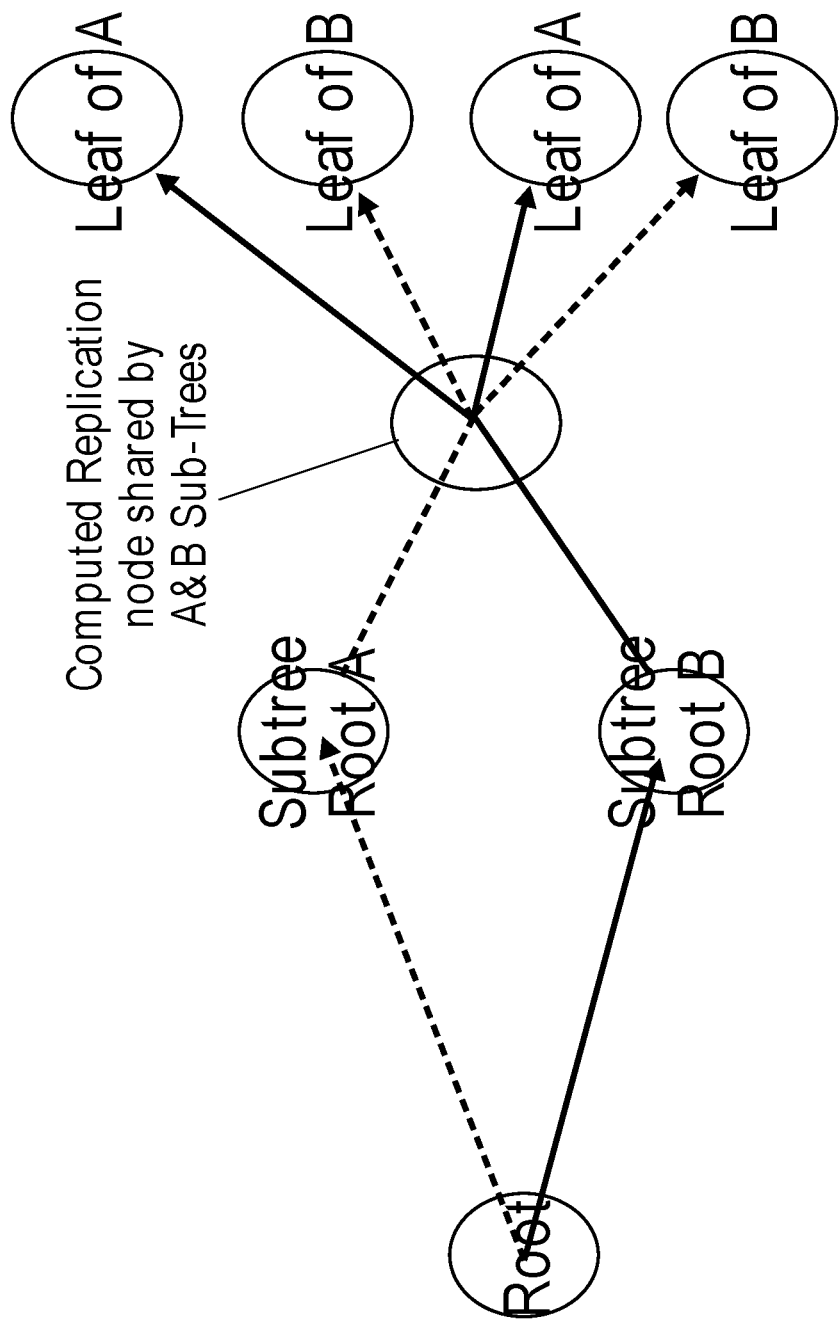
FIG. 3 is a diagram of one embodiment of a replication node for multiple sub-trees where the traffic for each is distinguished.

FIG. 3 is a diagram of one embodiment of a replication tree shared by multiple trees where the data traffic is differentiated. The problem of the shared replication tree can be resolved by providing a new S, G identifier for each pinned point (i.e., for each sub-tree) in the MDT and translating the received S,G identifier to the new identifier at each replication node. Any individual sub-tree between pinned replication nodes and a set of leaves can be guaranteed to be acyclic and therefore have no replication node in common. However, the problem is when sub-trees that share a common root sub tree cross over; using a distinct identifier allows them to be given separate treatment. A non-acyclic sub-tree means a replication node can receive multiple copies and cannot determine the correct set of leaves for each which results in duplication of delivery to individual leaves or worse. For MPLS technologies this means each sub-tree root gets its own label for an S, G tree, so even if sub-trees do collide they are treated as separate S,G trees by the replication node.

As mentioned herein above, as a result of the use of separate S, G labels for each sub-tree each sub-tree label need to be known network wide. As a consequence of arbitrary topology change, any node in the network may need to install state for a given sub-tree. An IGP flooded or signaled tree descriptor which indicates the hierarchy of subtrees in an individual MDT and would augment the normal group membership indications advertised in the distributed control plane.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 4:
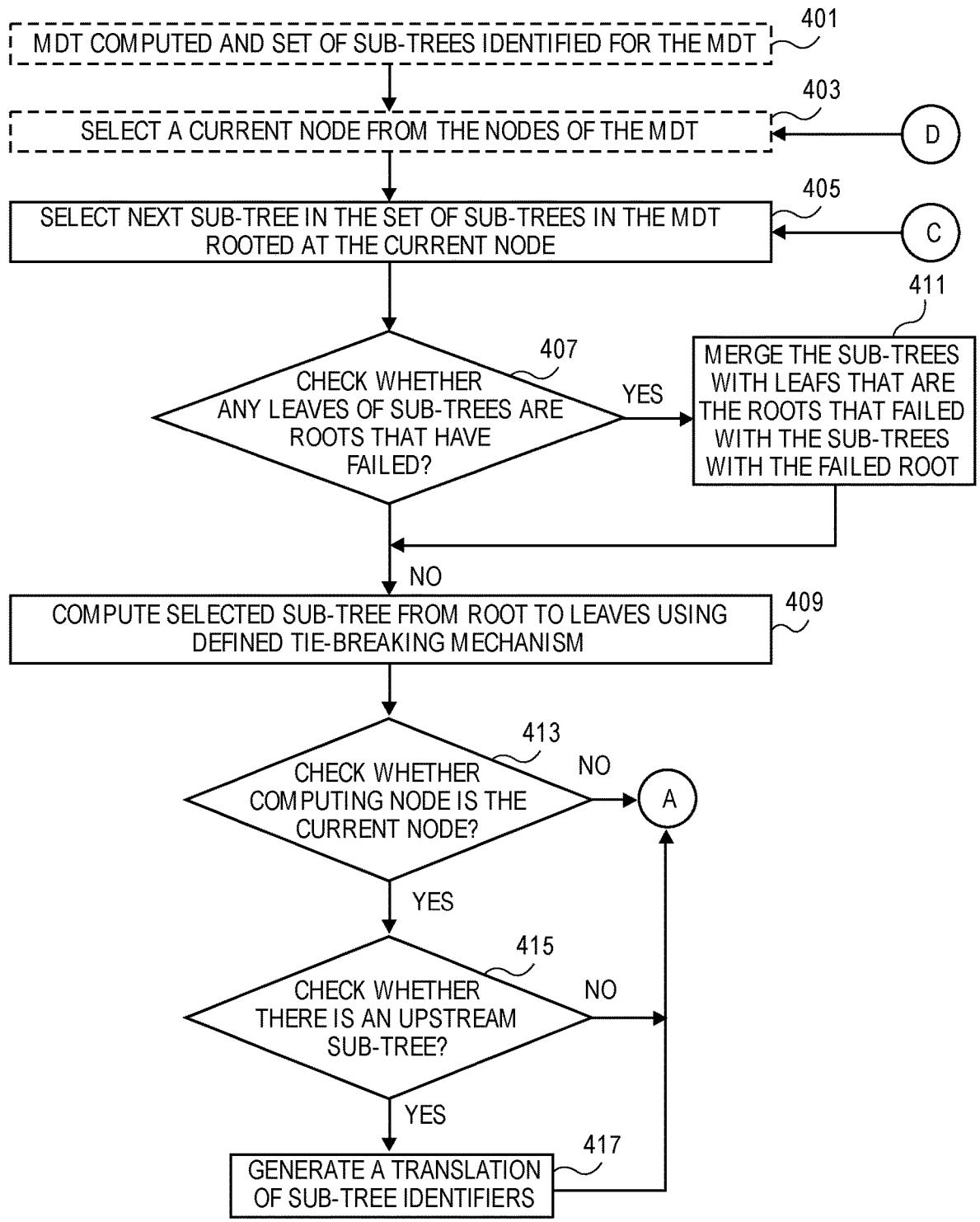
FIG. 4 is a flowchart of the process for computing sub-trees of the MDT.
Figure 4:
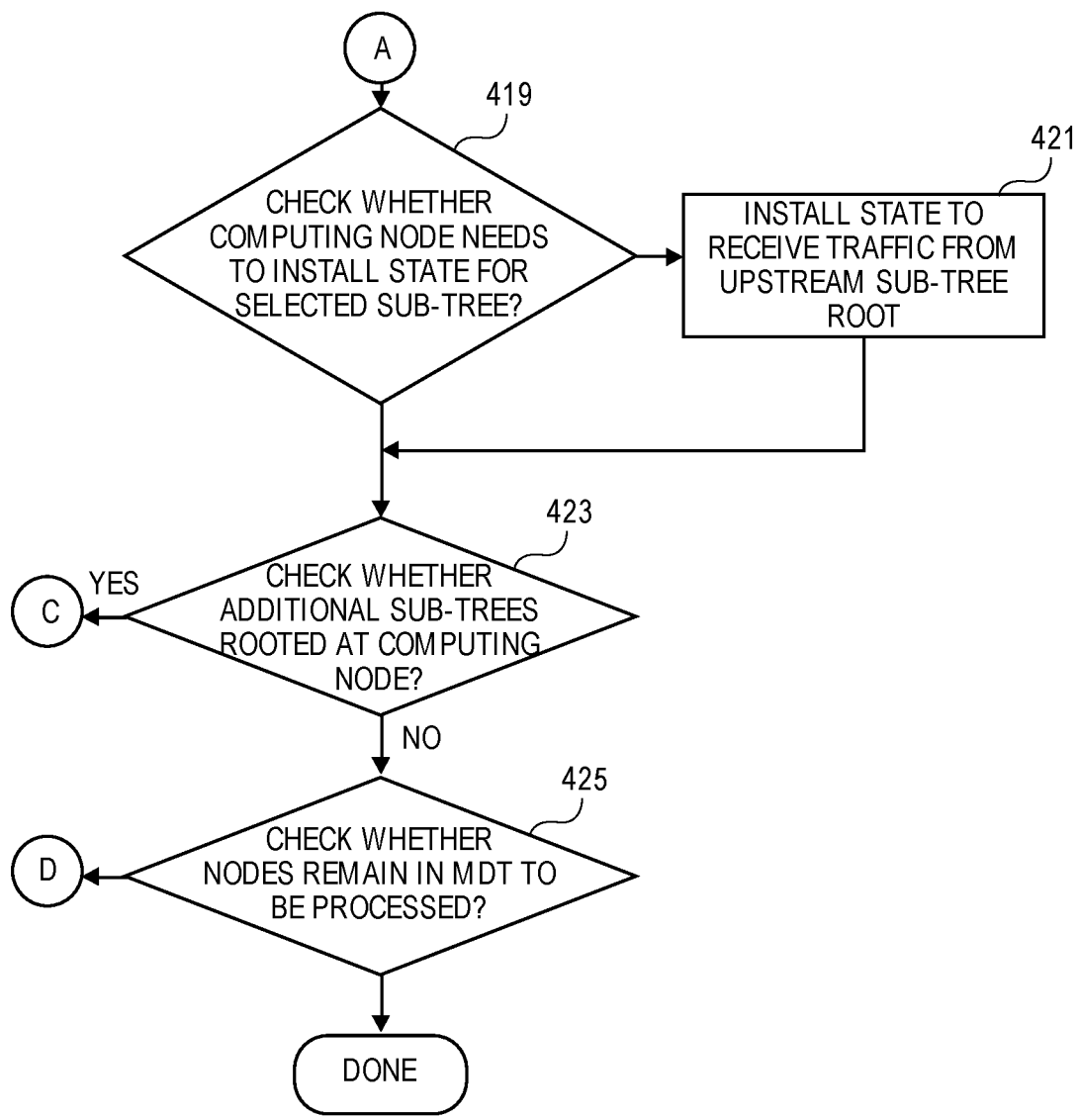

FIG. 4 is a diagram of one embodiment of the process for computing the sub-trees. In one embodiment, this process may be performed upon the change in the topology of the network, change in MDT membership, initiation of a MDT or similar circumstances.

Generally, a computing node selects a node in the network or a node in a loosely specified MDT. For each subtree rooted on the selected node, the computing node performs the following steps:

1) If the root for a given subtree has failed, or the root of any leaf subtrees has failed, the computing node adjusts the roots and leaves of the MDT accordingly before further processing to produce a superset of the two subtrees affected by the failure.

2) The computing node computes the complete MDT for each subtree rooted on the selected node.

3) If the computing node determines that it needs to install state for each subtree it does so.

4) If the computing node determines that it is a subtree root, it installs state to connect the downstream subtree(s) to the upstream subtree.

In reference to FIG. 4, an example embodiment of the process is described. The process may start with a previously computed or defined loosely specified MDT (Block 401). In addition, sub-tree descriptors and a hierarchical relationship of the sub-trees are communicated by a routing protocol of a distributed routing system between the nodes of the system. This information can then be utilized as part of the process for identifying sub-tree relationships and root nodes.

The process proceeds by selecting a first node, referred to as the current node, from the set of nodes in the network or in the loosely specified MDT (Block 403). Then the process selects a sub-tree in the set of sub-trees in the loosely specified MDT that is rooted at the current node (Block 405). Any number of sub-trees may be rooted at any given node.

A check is then made whether any leaves of the sub-trees or of the selected sub-tree are roots that have failed (Block 407). If there are roots that have failed then the process merges the sub-trees that are affected both the immediate upstream and downstream sub-trees are merged where the root has failed (Block 411). In other words, the sub-trees with leafs that are the failed roots are merged with the corresponding sub-trees with the failed roots.

After the merging process has completed or if there are no failed roots, then the process computes the complete MDT for the current sub-tree from the root to each of the leaves of the sub-tree (Block 409). Once the complete MDT has been computed for the selected sub-tree, a check is made whether the computing node is the current node (Block 413). If so, then the process checks whether there is an upstream sub-tree for the current node/computing node (Block 415). If there is an upstream sub-tree then the process generates a translation of sub-tree identifiers between the sub-tree identifiers of the selected sub-tree and a sub-tree identifier of an upstream sub-tree (Block 417). In some embodiments, the sub-tree identifiers are labels and the process cross connects the labels of the sub-trees (i.e., of the upstream and downstream sub-trees).

If there is no upstream sub-tree or after the cross connect, the process continues to check whether the computing node needs to install state for the selected sub-tree (Block 419). If the computing node does need to install state for the selected sub-tree, then the process installs the state (Block 421) for the computing node. This may entail installing the state to receive traffic from the upstream sub-tree root. If not, state needs to be installed or after the state has been installed, then a check is made whether additional sub-trees rooted at the selected node remain to be processed (Block 423). If so, then the process continues be selected the next sub-tree (Block 405). If there not additional sub-trees, then the process checks whether there are additional nodes in the loosely specified MDT or the network to be processed (Block 425). If there are additional nodes to process, then a next 'current' node is selected (Block 403). Otherwise the process completes.

In one example embodiment, this process may described through pseudocode as set forth below:

```
Pseudo code
Start /* construct multicast FIB : performed by computing node */
For each node in network → current node
First sub-tree MDT rooted on current node
While MDTs rooted on current node not yet computed
    Compute sub-tree for MDT sub-tree root to sub-tree leaves
        Compute full tree
        if a leaf is a sub-tree root that has failed, merge leaves of that sub-
tree with current sub-tree root set
        tie break using any tie breaking mechanism for the set of leaves
for the sub-tree
    If computing node is non sub-tree-root and a replication node then
        install appropriate state to replicate to leaves and replication trees
    endif
    if computing node is also current sub-tree root
        install appropriate state to replicate to leaves and replication trees
        If upstream state for overall tree already present
            cross connect sub-tree labels
        endif
    endif
    if computing node is leaf on the current sub-tree
        install appropriate state to receive from upstream sub-tree root
        If computing node is a sub-tree root
            cross connect sub-tree labels
        endif
    endif
    next MDT
End while
Next node
End for
```

Figure 5:
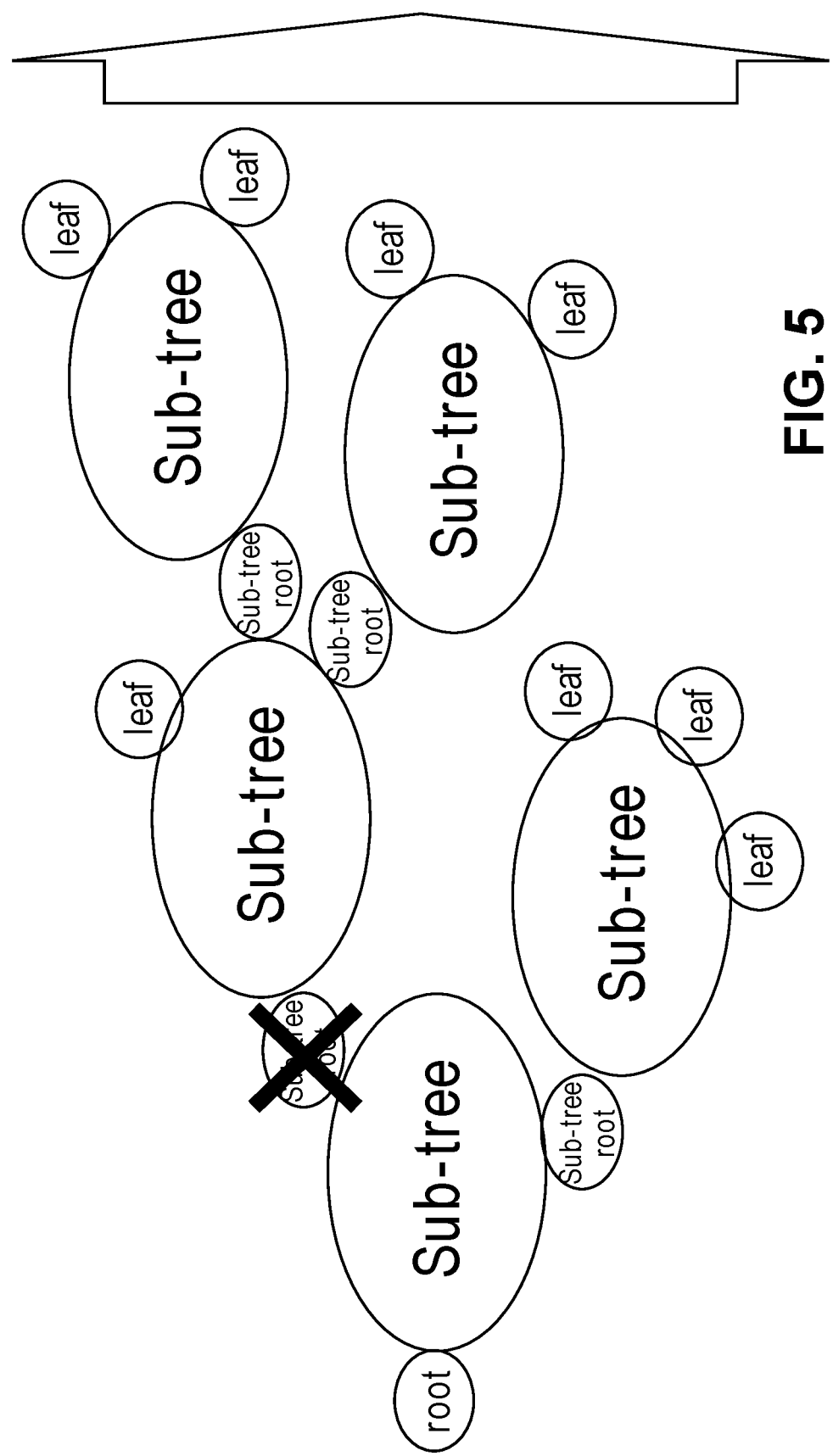
FIG. 5 is a diagram of one embodiment of the network and MDT that illustrates how the embodiments handle the failure of a sub-tree root.
Figure 5:
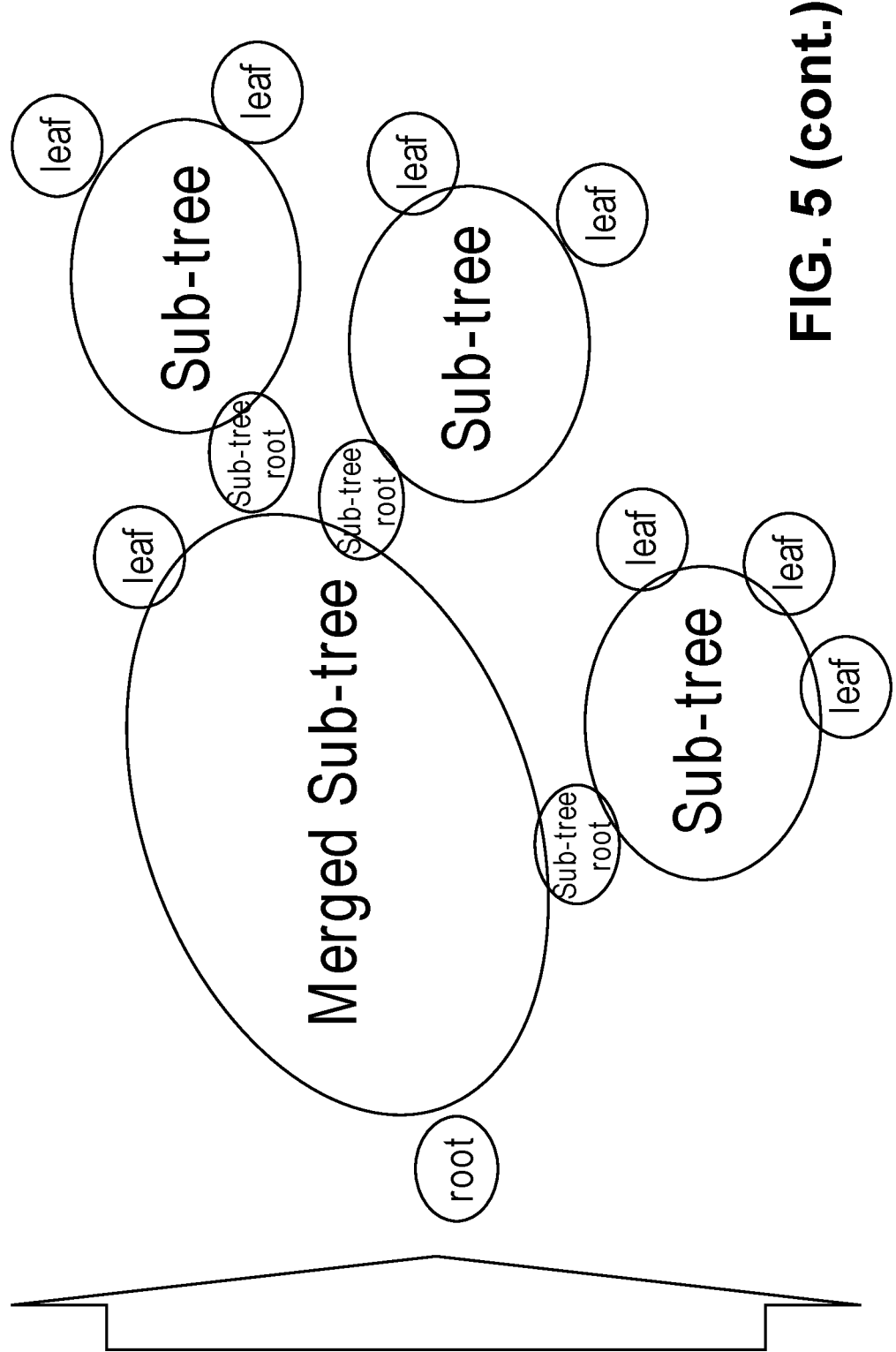

FIG. 5 is a diagram of one embodiment of the network and MDT that illustrates how the process handles the failure of a sub-tree root. The left hand side illustrates a MDT in which the node that serves as the root of a stage two sub-tree has failed. As described above, this results in the merger of the sub-tree that has the failed node with the sub-tree where that same node is a replicating node. This merger is performed before the calculation of the complete sub-tree. The right hand side of the illustration shows that the MDT after the merger, where the merged sub-tree encompasses all of the nodes of the two constituent sub-trees. After the merger the MDT encompasses the same nodes that service the same leaves and same root. The merged sub-tree uses the S,G identifier of the of the upstream subtree (which inherited the leaves of the subtree with the failed root) as this will result in a minimum of churn in the overall network.

Thus, the computation of the merged sub-trees assumes the stages on either side of the failed sub-tree root are merged, so a single root simply serves a larger constellation of listeners (either sub-tree roots for the next stage or leaves). The upstream root and intermediate replication nodes add state to serve new set of leaves. Leaves add state to accept data from a different root.

Thus, the embodiments provide a number of advantages over the prior art. The concept that loose hops in an MDT with pinned transit points can be independently computed is an advance over the prior art. Treating each loose hop as an independent tree and stitching them together is an advance over the prior art. Modelling each sub-tree as an independent tree identifier-wise is also an advance over the art. The allocation of a global per-sub-tree identifier (e.g., a global label) is an advance over the prior art. This permits independent computation of replication trees within each sub-tree. Similarly, the combination of these elements provides the advantages defined herein.

Figure 6:
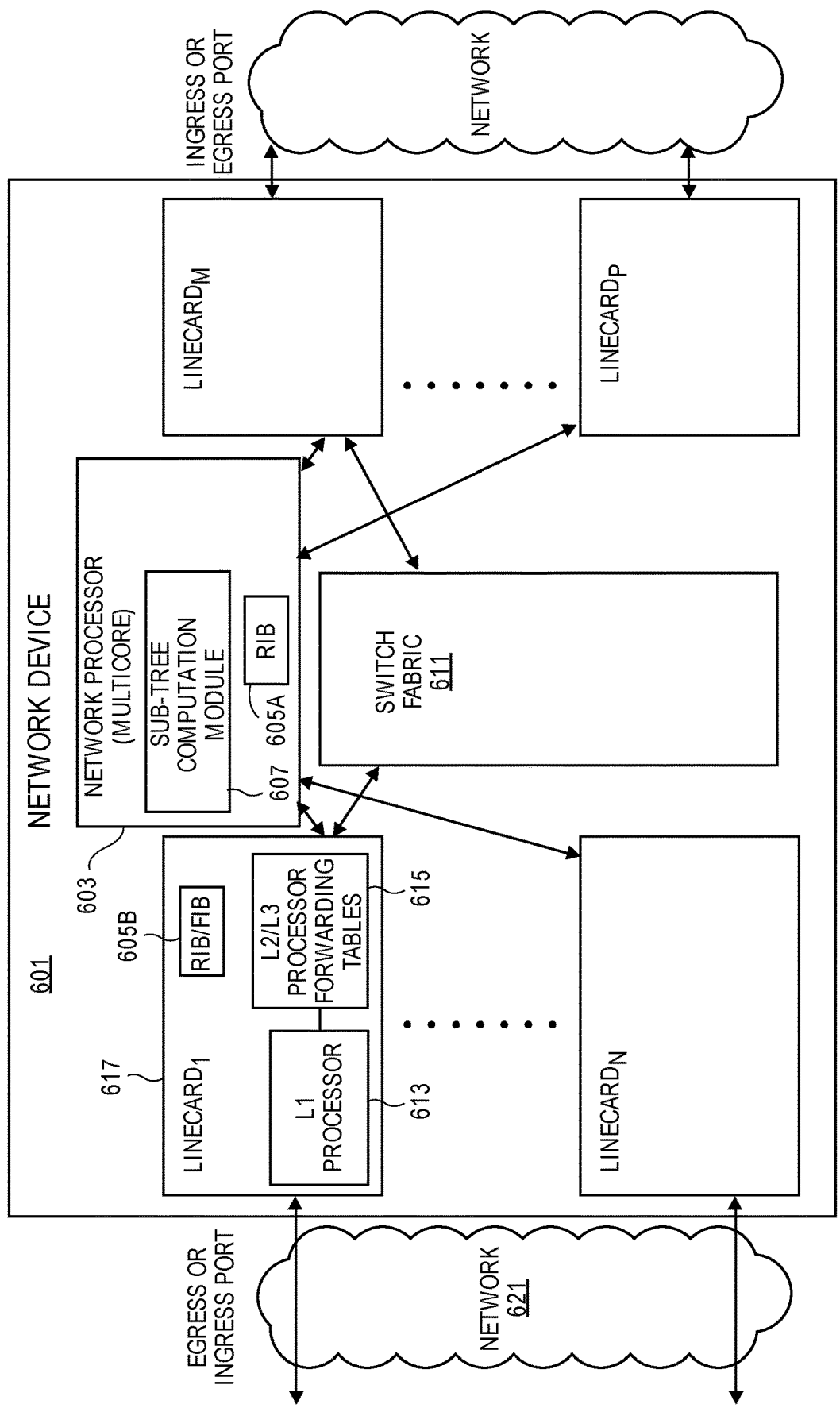
FIG. 6 is a diagram of one embodiment of a network device implementing the sub-tree computation module.

FIG. 6 is a diagram of one embodiment of the network device. In one embodiment, the determination and configuration of quick change IP channels is implemented by a network device 601 or similar computing device. The network device 601 can have any structure that enables it to receive data traffic (e.g., multicast data traffic) and forward it toward its destination. The network device 601 can include a network processor 603 or set of network processors that execute the functions of the network device 601. A 'set,' as used herein, is any positive whole number of items including one item. The network device 601 can execute sub-tree computation modules 607 to implement the functions of configuring the network for proper handling of quick change IP channels forwarding of data packets across networks where the network device 601 functions as a node in this network as described herein above via a network processor 603.

The network device 601 connects with separately administered networks that have user equipment and/or content servers. The network processor 603 can implement the sub-tree computation module(s) 607 as a discrete hardware, software module or any combination thereof. The network processor 603 can also service the routing information base 605A and similar functions related to data traffic forwarding and network topology maintenance. The routing information base 605A can be implemented as match action tables that are utilized for forwarding protocol data units PDUs (i.e. packets). The functions of the sub-tree computation module (s) 607 can be implemented as modules in any combination of software, including firmware, and hardware within the network device. The functions of the multicast management module(s) 607 that are executed and implemented by the network device 601 include those described further herein above.

In one embodiment, the network device 601 can include a set of line cards 617 that process and forward the incoming data traffic toward the respective destination nodes by identifying the destination and forwarding the data traffic to the appropriate line card 617 having an egress port that leads to or toward the destination via a next hop. These line cards 617 can also implement the forwarding information base and/label forwarding base 605B, or a relevant subset thereof. The line cards 617 can also implement or facilitate the multicast management module(s) 307 functions described herein above. The line cards 617 are in communication with one another via a switch fabric 611 and communicate with other nodes over attached networks 621 using Ethernet, fiber optic or similar communication links and media.

Figures 7A, 7B:
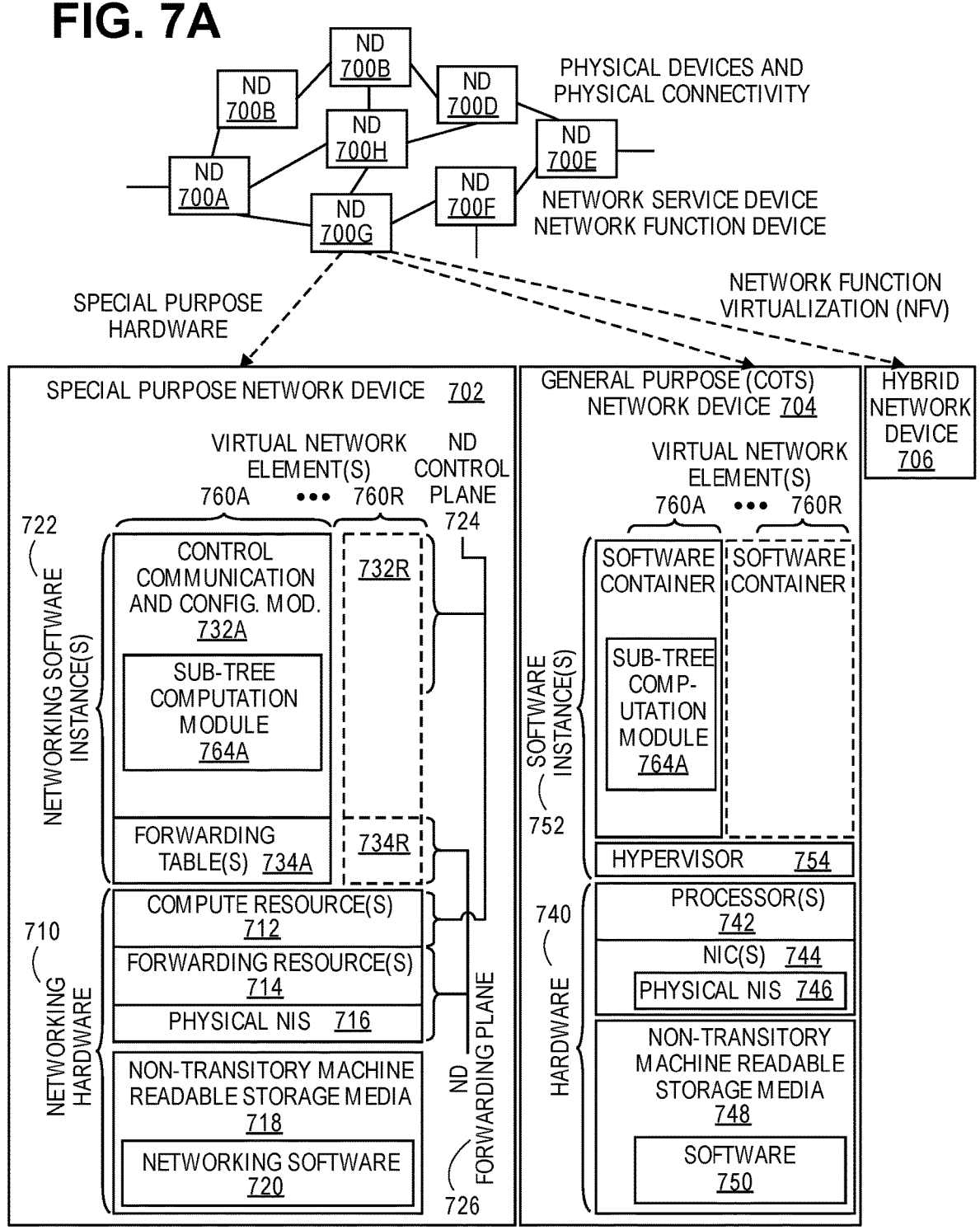
FIG. 7A illustrates connectivity between network devices (NDs) within an exemplary network, as well as three exemplary implementations of the NDs, according to some embodiments of the invention.
FIG. 7B illustrates an exemplary way to implement a special-purpose network device according to some embodiments of the invention.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link). An additional line extending from NDs 700A, E, and F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application—specific integrated—circuits (ASICs) and a proprietary operating system (OS); and 2) a general purpose network device 704 that uses common off-the-shelf (COTS) processors and a standard OS.

The special-purpose network device 702 includes networking hardware 710 comprising compute resource(s) 712 (which typically include a set of one or more processors), forwarding resource(s) 714 (which typically include one or more ASICs and/or network processors), and physical network interfaces (NIs) 716 (sometimes called physical ports), as well as non-transitory machine readable storage media 718 having stored therein networking software 720. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 700A-H. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

Software 720 can include code which when executed by networking hardware 710, causes networking hardware 710 to perform operations of one or more embodiments of the present invention as part networking software instances 722. The software 720 includes the sub-tree computation module 764A.

The special-purpose network device 702 is often physically and/or logically considered to include: 1) a ND control plane 724 (sometimes referred to as a control plane) comprising the compute resource(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the compute resource(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/ Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein software 750. During operation, the processor(s) 742 execute the software 750 to instantiate one or more sets of one or more applications 764A-R. While one embodiment does not implement virtualization, alternative embodiments may use different forms of virtualization—represented by a virtualization layer 754 and software containers 762A-R. For example, one such alternative embodiment implements operating system-level virtualization, in which case the virtualization layer 754 represents the kernel of an operating system (or a shim executing on a base operating system) that allows for the creation of multiple software containers 762A-R that may each be used to execute one of the sets of applications 764A-R. In this embodiment, the multiple software containers 762A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 754 represents a hypervisor (sometimes referred to as a virtual machine monitor (VMM)) or a hypervisor executing on top of a host operating system; and 2) the software containers 762A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications 764A-R, as well as the virtualization layer 754 and software containers 762A-R if implemented, are collectively referred to as software instance(s) 752. Each set of applications 764A-R, corresponding software container 762A-R if implemented, and that part of the hardware 740 that executes them (be it hardware dedicated to that execution and/or time slices of hardware temporally shared by software containers 762A-R), forms a separate virtual network element(s) 760A-R.

The virtual network element(s) 760A-R perform similar functionality to the virtual network element(s) 730A-R— e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 762A-R differently. For example, while embodiments of the invention are illustrated with each software container 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 762A-R to VNEs also apply to embodiments where such a finer level of granularity is used.

In certain embodiments, the virtualization layer 754 includes a virtual switch that provides similar forwarding services as a physical Ethernet switch. Specifically, this virtual switch forwards traffic between software containers 762A-R and the NIC(s) 744, as well as optionally between the software containers 762A-R; in addition, this virtual switch may enforce network isolation between the VNEs 760A-R that by policy are not permitted to communicate with each other (e.g., by honoring virtual local area networks (VLANs)).

Software 750 can include code, which when executed by processor(s) 742, causes processor(s) 742 to perform operations of one or more embodiments of the present invention as part software containers 762A-R. The software 750 can include the sub-tree computation module 764A.

The third exemplary ND implementation in FIG. 7A is a hybrid network device 706, which includes both custom ASICs/proprietary OS and COTS processors/standard OS in a single ND or a single card within an ND. In certain embodiments of such a hybrid network device, a platform VM (i.e., a VM that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services (DSCP) values.

Figure 7C:
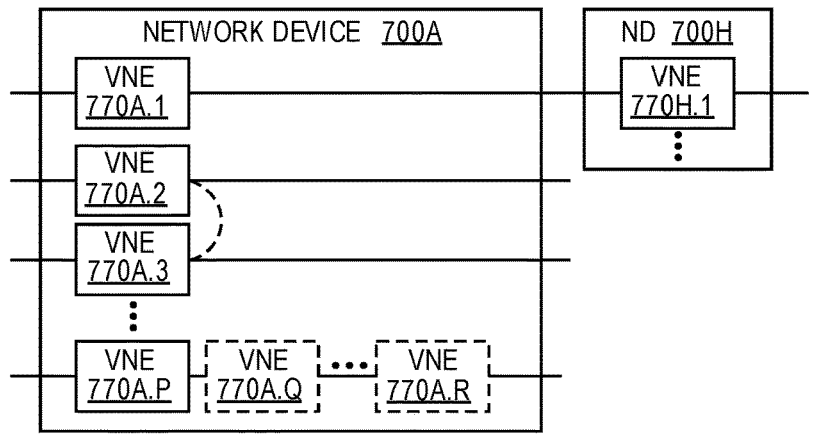
FIG. 7C illustrates various exemplary ways in which virtual network elements (VNEs) may be coupled according to some embodiments of the invention.

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service— e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software containers 762A-R may operate as servers; the same would be true for the hybrid network device 706; in the case of the special-purpose network device 702, one or more such servers could also be run on a virtualization layer executed by the compute resource(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network-originated attacks, to avoid malformed route announcements), and management capabilities (e.g., full detection and processing).

Figure 7D:
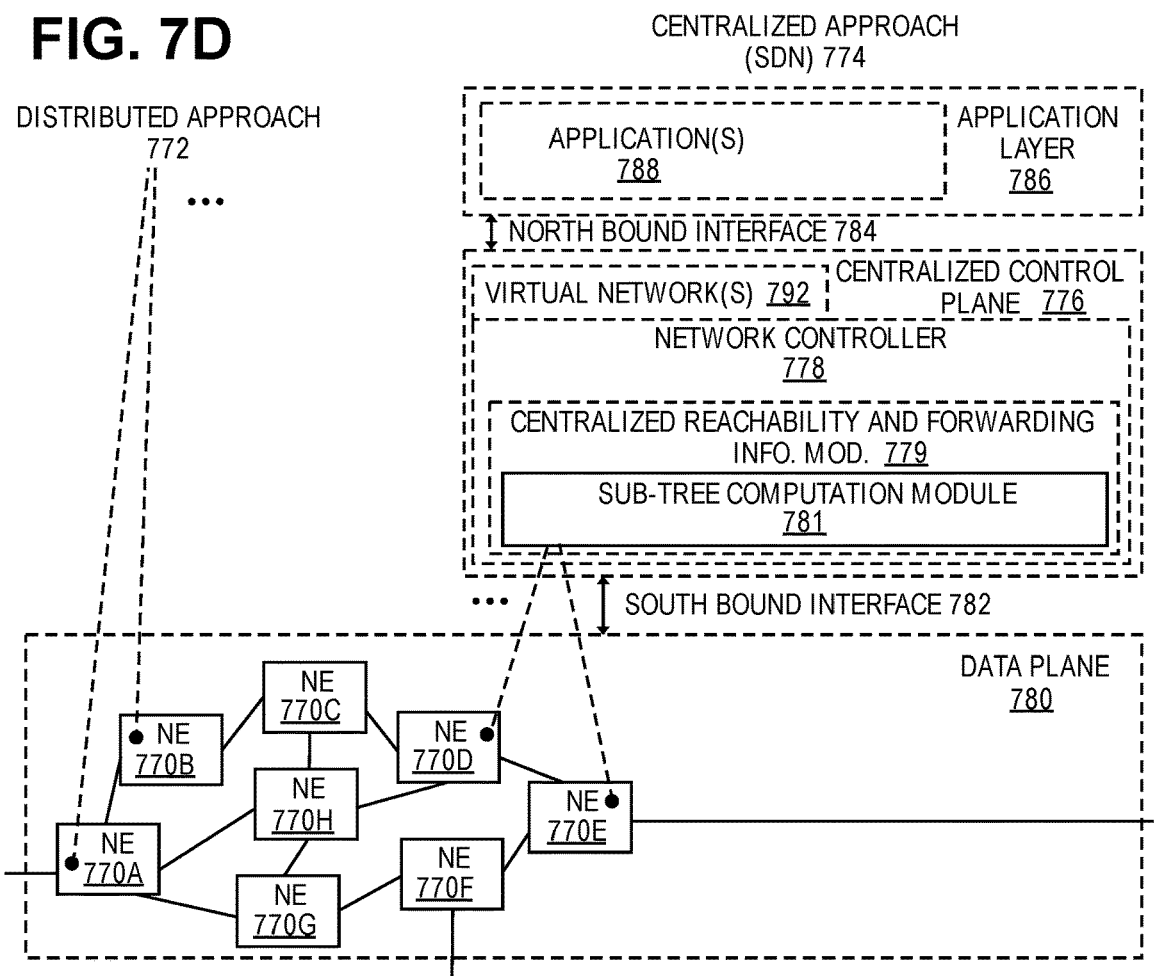
FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP)), Label Distribution Protocol (LDP), Resource Reservation Protocol (RSVP), as well as RSVP-Traffic Engineering (TE): Extensions to RSVP for LSP Tunnels, Generalized Multi-Protocol Label Switching (GMPLS) Signaling RSVP-TE that communicate with other NEs to exchange routes, and then selects those routes based on one or more routing metrics. Thus, the NEs 770A-H (e.g., the compute resource(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the compute resource(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

In some embodiments, the sub-tree computation module 781 is implemented as part of the centralized reachability and forwarding information module 779, as part of the applications 788 in the application layer 786 or as part of a similar component of the centralized control plane 776 or application layer 786. This can be in conjunction with a centralized module that implements the programming of unicast forwarding, or used as an adjunct to unicast forwarding programmed by a distributed routing system.

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
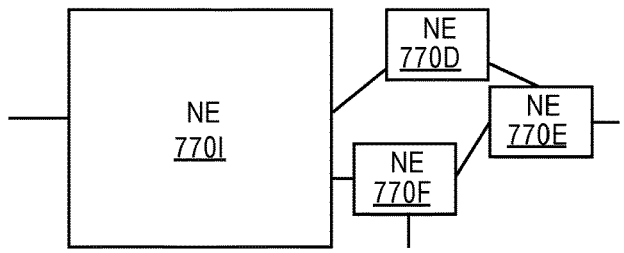
FIG. 7E illustrates the simple case of where each of the NDs implements a single NE, but a centralized control plane has abstracted multiple of the NEs in different NDs into (to represent) a single NE in one of the virtual network(s), according to some embodiments of the invention.
Figure 7F:
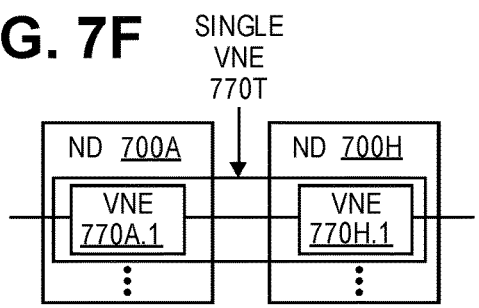
FIG. 7F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments of the invention. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
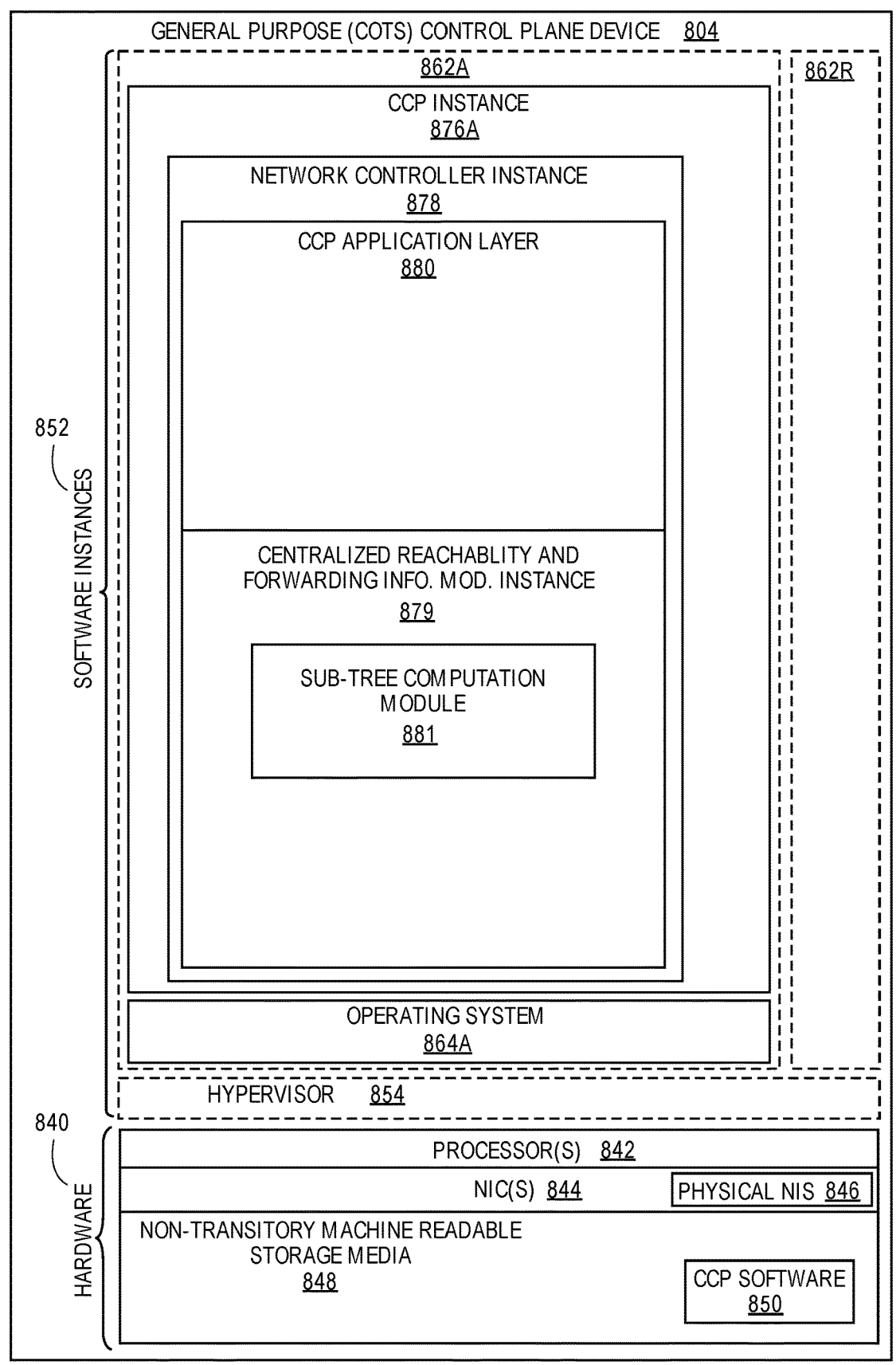
FIG. 8 illustrates a general purpose control plane device with centralized control plane (CCP) software, according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein centralized control plane (CCP) software 850.

In embodiments that use compute virtualization, the processor(s) 842 typically execute software to instantiate a virtualization layer 854 and software container(s) 862A-R (e.g., with operating system-level virtualization, the virtualization layer 854 represents the kernel of an operating system (or a shim executing on a base operating system) that allows for the creation of multiple software containers 862A-R (representing separate user space instances and also called virtualization engines, virtual private servers, or jails) that may each be used to execute a set of one or more applications; with full virtualization, the virtualization layer 854 represents a hypervisor (sometimes referred to as a virtual machine monitor (VMM)) or a hypervisor executing on top of a host operating system, and the software containers 862A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 850 (illustrated as CCP instance 876A) is executed within the software container 862A on the virtualization layer 854. In embodiments where compute virtualization is not used, the CCP instance 876A on top of a host operating system is executed on the "bare metal" general purpose control plane device 804. The instantiation of the CCP instance 876A, as well as the virtualization layer 854 and software containers 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user—interfaces). At a more abstract level, this CCP application layer 880 within the centralized control plane 776 works with virtual network view(s) (logical view(s) of the network) and the middleware layer provides the conversion from the virtual networks to the physical view.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

In some embodiments, the sub-tree computation module 881 is implemented as part of the centralized reachability and forwarding information module 879, as part of the applications in the application layer 880 or as part of a similar component of the centralized control plane device 804.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Some NDs include functionality for authentication, authorization, and accounting (AAA) protocols (e.g., RADIUS (Remote Authentication Dial-In User Service), Diameter, and/or TACACS+ (Terminal Access Controller Access Control System Plus). AAA can be provided through a client/server model, where the AAA client is implemented on a ND and the AAA server can be implemented either locally on the ND or on a remote electronic device coupled with the ND. Authentication is the process of identifying and verifying a subscriber. For instance, a subscriber might be identified by a combination of a username and a password or through a unique key. Authorization determines what a subscriber can do after being authenticated, such as gaining access to certain electronic device information resources (e.g., through the use of access control policies). Accounting is recording user activity. By way of a summary example, end user devices may be coupled (e.g., through an access network) through an edge ND (supporting AAA processing) coupled to core NDs coupled to electronic devices implementing servers of service/content providers. AAA processing is performed to identify for a subscriber the subscriber record stored in the AAA server for that subscriber. A subscriber record includes a set of attributes (e.g., subscriber name, password, authentication information, access control information, rate-limiting information, policing information) used during processing of that subscriber's traffic.

Certain NDs (e.g., certain edge NDs) internally represent end user devices (or sometimes customer premise equipment (CPE) such as a residential gateway (e.g., a router, modem)) using subscriber circuits. A subscriber circuit uniquely identifies within the ND a subscriber session and typically exists for the lifetime of the session. Thus, a ND typically allocates a subscriber circuit when the subscriber connects to that ND, and correspondingly de-allocates that subscriber circuit when that subscriber disconnects. Each subscriber session represents a distinguishable flow of packets communicated between the ND and an end user device (or sometimes CPE such as a residential gateway or modem) using a protocol, such as the point-to-point protocol over another protocol (PPPoX) (e.g., where X is Ethernet or Asynchronous Transfer Mode (ATM)), Ethernet, 802.1Q Virtual LAN (VLAN), Internet Protocol, or ATM). A subscriber session can be initiated using a variety of mechanisms (e.g., manual provisioning a dynamic host configuration protocol (DHCP), DHCP/client-less internet protocol service (CLIPS) or Media Access Control (MAC) address tracking). For example, the point-to-point protocol (PPP) is commonly used for digital subscriber line (DSL) services and requires installation of a PPP client that enables the subscriber to enter a username and a password, which in turn may be used to select a subscriber record. When DHCP is used (e.g., for cable modem services), a username typically is not provided; but in such situations other information (e.g., information that includes the MAC address of the hardware in the end user device (or CPE)) is provided. The use of DHCP and CLIPS on the ND captures the MAC addresses and uses these addresses to distinguish subscribers and access their subscriber records.

A virtual circuit (VC), synonymous with virtual connection and virtual channel, is a connection oriented communication service that is delivered by means of packet mode communication. Virtual circuit communication resembles circuit switching, since both are connection oriented, meaning that in both cases data is delivered in correct order, and signaling overhead is required during a connection establishment phase. Virtual circuits may exist at different layers. For example, at layer 4, a connection oriented transport layer datalink protocol such as Transmission Control Protocol (TCP) may rely on a connectionless packet switching network layer protocol such as IP, where different packets may be routed over different paths, and thus be delivered out of order. Where a reliable virtual circuit is established with TCP on top of the underlying unreliable and connectionless IP protocol, the virtual circuit is identified by the source and destination network socket address pair, i.e. the sender and receiver IP address and port number. However, a virtual circuit is possible since TCP includes segment numbering and reordering on the receiver side to prevent out-of-order delivery. Virtual circuits are also possible at Layer 3 (network layer) and Layer 2 (datalink layer); such virtual circuit protocols are based on connection oriented packet switching, meaning that data is always delivered along the same network path, i.e. through the same NEs/VNEs. In such protocols, the packets are not routed individually and complete addressing information is not provided in the header of each data packet; only a small virtual channel identifier (VCI) is required in each packet; and routing information is transferred to the NEs/VNEs during the connection establishment phase; switching only involves looking up the virtual channel identifier in a table rather than analyzing a complete address. Examples of network layer and datalink layer virtual circuit protocols, where data always is delivered over the same path: X.25, where the VC is identified by a virtual channel identifier (VCI); Frame relay, where the VC is identified by a VCI; Asynchronous Transfer Mode (ATM), where the circuit is identified by a virtual path identifier (VPI) and virtual channel identifier (VCI) pair; General Packet Radio Service (GPRS); and Multiprotocol label switching (MPLS), which can be used for IP over virtual circuits (Each circuit is identified by a label).

Certain NDs (e.g., certain edge NDs) use a hierarchy of circuits. The leaf nodes of the hierarchy of circuits are subscriber circuits. The subscriber circuits have parent circuits in the hierarchy that typically represent aggregations of multiple subscriber circuits, and thus the network segments and elements used to provide access network connectivity of those end user devices to the ND. These parent circuits may represent physical or logical aggregations of subscriber circuits (e.g., a virtual local area network (VLAN), a permanent virtual circuit (PVC) (e.g., for Asynchronous Transfer Mode (ATM)), a circuit-group, a channel, a pseudo-wire, a physical NI of the ND, and a link aggregation group). A circuit-group is a virtual construct that allows various sets of circuits to be grouped together for configuration purposes, for example aggregate rate control. A pseudo-wire is an emulation of a layer 2 point-to-point connection-oriented service. A link aggregation group is a virtual construct that merges multiple physical NIs for purposes of bandwidth aggregation and redundancy. Thus, the parent circuits physically or logically encapsulate the subscriber circuits.

Each VNE (e.g., a virtual router, a virtual bridge (which may act as a virtual switch instance in a Virtual Private LAN Service (VPLS) is typically independently administrable. For example, in the case of multiple virtual routers, each of the virtual routers may share system resources but is separate from the other virtual routers regarding its management domain, AAA (authentication, authorization, and accounting) name space, IP address, and routing database(s). Multiple VNEs may be employed in an edge ND to provide direct network access and/or different classes of services for subscribers of service and/or content providers.

Within certain NDs, "interfaces" that are independent of physical NIs may be configured as part of the VNEs to provide higher-layer protocol and service information (e.g., Layer 3 addressing). The subscriber records in the AAA server identify, in addition to the other subscriber configuration requirements, to which context (e.g., which of the VNEs/NEs) the corresponding subscribers should be bound within the ND. As used herein, a binding forms an association between a physical entity (e.g., physical NI, channel) or a logical entity (e.g., circuit such as a subscriber circuit or logical circuit (a set of one or more subscriber circuits)) and a context's interface over which network protocols (e.g., routing protocols, bridging protocols) are configured for that context. Subscriber data flows on the physical entity when some higher-layer protocol interface is configured and associated with that physical entity.

Some NDs provide support for implementing VPNs (Virtual Private Networks) (e.g., Layer 2 VPNs and/or Layer 3 VPNs). For example, the ND where a provider's network and a customer's network are coupled are respectively referred to as PEs (Provider Edge) and CEs (Customer Edge). In a Layer 2 VPN, forwarding typically is performed on the CE(s) on either end of the VPN and traffic is sent across the network (e.g., through one or more PEs coupled by other NDs). Layer 2 circuits are configured between the CEs and PEs (e.g., an Ethernet port, an ATM permanent virtual circuit (PVC), a Frame Relay PVC). In a Layer 3

VPN, routing typically is performed by the PEs. By way of example, an edge ND that supports multiple VNEs may be deployed as a PE; and a VNE may be configured with a VPN protocol, and thus that VNE is referred as a VPN VNE.

Some NDs provide support for VPLS (Virtual Private LAN Service). For example, in a VPLS network, end user devices access content/services provided through the VPLS network by coupling to CEs, which are coupled through PEs coupled by other NDs. VPLS networks can be used for implementing triple play network applications (e.g., data applications (e.g., high-speed Internet access), video applications (e.g., television service such as IPTV (Internet Protocol Television), VoD (Video-on-Demand) service), and voice applications (e.g., VoIP (Voice over Internet Protocol) service)), VPN services, etc. VPLS is a type of layer 2 VPN that can be used for multi-point connectivity. VPLS networks also allow end use devices that are coupled with CEs at separate geographical locations to communicate with each other across a Wide Area Network (WAN) as if they were directly attached to each other in a Local Area Network (LAN) (referred to as an emulated LAN).

In VPLS networks, each CE typically attaches, possibly through an access network (wired and/or wireless), to a bridge module of a PE via an attachment circuit (e.g., a virtual link or connection between the CE and the PE). The bridge module of the PE attaches to an emulated LAN through an emulated LAN interface. Each bridge module acts as a "Virtual Switch Instance" (VSI) by maintaining a forwarding table that maps MAC addresses to pseudowires and attachment circuits. PEs forward frames (received from CEs) to destinations (e.g., other CEs, other PEs) based on the MAC destination address field included in those frames.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method implemented by a networking device functioning as a computing node, the method to resolve sub-trees of a loosely specified multicast distribution tree (MDT), the method to utilize global identifiers for sub-trees of the MDT to enable differentiation of traffic destined for different sub-trees of the MDT at shared replication nodes, the method implemented at each of the nodes of the network that are part of the MDT, the method comprising:
   selecting, by the computing node, a sub-tree in a set of sub-trees in the MDT, the selected sub-tree rooted at a current node within the MDT;
   computing, by the computing node, the selected sub-tree by identifying specific hops that are unspecified from a root of the selected sub-tree to leaves; and
   generating, by the computing node, a translation of sub-tree identifiers between the sub-tree identifiers of the selected sub-tree and a sub-tree identifier of an upstream sub-tree, in response to the computing node determining that the computing node is the current node, the sub-tree root of the selected sub-tree, and that there is an upstream sub-tree for the computing node.

2. The method of claim 1, wherein the loosely specified MDT does not specify each hop of the MDT and includes at least one waypoint on a path between a root and at least one leaf of the MDT, where the path includes unspecified hops and the at least one waypoint is an intermediate node that is specified within the unspecified hops.

3. The method of claim 1, further comprising:
   installing state by the computing node to reach leaves or replication nodes in the selected sub-tree.

4. The method of claim 1, wherein each of the global identifiers are labels, and the translation is a cross-connect of the labels between the selected sub-tree and the upstream sub-tree.

5. The method of claim 1, wherein the loosely specified MDT is defined in a multi-protocol label switching (MPLS) or source packet routing in networking (SPRING) segment routing instantiation.

6. The method of claim 1, wherein sub-tree descriptors and hierarchical relationship of the sub-trees has been communicated by a routing protocol of a distributed routing system.

7. A network device configured to implement a method to resolve sub-trees of a loosely specified multicast distribution tree (MDT), the method to utilize global identifiers for sub-trees of the MDT to enable differentiation of traffic destined for different sub-trees of the MDT at shared replication nodes, the method implemented at each of the nodes of the network that are part of the MDT, the network device comprising:
a non-transitory machine-readable medium to store a sub-tree computation module; and
a processor coupled to the non-transitory machine-readable medium to execute the sub-tree computation module, the processor configured to select a next sub-tree in the set of sub-trees in the MDT, the selected sub-tree rooted at a current node within the MDT, to compute the selected sub-tree by identifying specific hops that are unspecified from a root of the selected sub-tree to leaves, and to generate a translation of sub-tree identifiers between the sub-tree identifiers of the selected sub-tree and a sub-tree identifier of an upstream sub-tree, in response to the computing node determining that the computing node is the current node, the sub-tree root of the selected sub-tree, and that there is an upstream sub-tree for the computing node.

8. The network device of claim 7, wherein the loosely specified MDT does not specify each hop of the MDT and includes at least one waypoint on a path between a root and at least one leaf of the MDT, where the path includes unspecified hops and the at least one waypoint is an intermediate node that is specified within the unspecified hops.

9. The network device of claim 7, wherein the sub-tree computation module processor is further configured to install state to reach leaves or replication nodes in the selected sub-tree.

10. The network device of claim 7, wherein each of the global identifiers are labels, and the translation is a cross-connect of the labels between the selected sub-tree and the upstream sub-tree.

11. The network device of claim 7, wherein the loosely specified MDT is defined in a multi-protocol label switching (MPLS) or source packet routing in networking (SPRING) segment routing instantiation.

12. The network device of claim 7, wherein sub-tree descriptors and hierarchical relationship of the sub-trees has been communicated by a routing protocol of a distributed routing system.

13. A computing device in communication with a network device in a network with a plurality of network devices, the computing device to execute a plurality of virtual machines for implementing network function virtualization (NFV), wherein a virtual machine from the plurality of virtual machines is configured to implement a method to resolve sub-trees of a loosely specified multicast distribution tree (MDT), the method to utilize global identifiers for sub-trees to enable differentiation of traffic of different sub-trees at shared replication nodes, the method implemented for each of the nodes of the network that are part of the MDT, the computing device comprising:
a non-transitory machine-readable medium to store a sub-tree computation module; and
a processor coupled to the non-transitory machine-readable medium to execute the sub-tree computation module, the processor configured to select a next sub-tree in the set of sub-trees in the MDT, the selected sub-tree rooted at a current node within the MDT, to compute the selected sub-tree by identifying specific hops that are unspecified from a root of the selected sub-tree to leaves, and to generate a translation of sub-tree identifiers between the sub-tree identifiers of the selected sub-tree and a sub-tree identifier of an upstream sub-tree, in response to a computing node determining that the computing node is functioning as the current node, the sub-tree root of the selected sub-tree, and that there is an upstream sub-tree for the computing node.

14. The computing device of claim 13, wherein the loosely specified MDT does not specify each hop of the MDT and includes at least one waypoint on a path between a root and at least one leaf of the MDT, where the path includes unspecified hops and the at least one waypoint is an intermediate node that is specified within the unspecified hops.

15. The computing device of claim 13, wherein the processor sub-tree computation module is further configured to install state to reach leaves or replication nodes in the selected sub-tree.

16. The computing device of claim 13, wherein each of the global identifiers are labels, and the translation is a cross-connect of the labels between the selected sub-tree and the upstream sub-tree.

17. The computing device of claim 13, wherein the loosely specified MDT is defined in a multi-protocol label switching (MPLS) or source packet routing in networking (SPRING) segment routing instantiation.

18. A control plane device is configured to implement a control plane of a software defined networking (SDN) network including a network device in a network with a plurality of network devices, wherein the control plane device is configured to implement a method to resolve sub-trees of a loosely specified multicast distribution tree (MDT), the method to utilize global identifiers for sub-trees of the MDT to enable differentiation of traffic destined for different sub-trees of the MDT at shared replication nodes, the method implemented to configure each of the nodes of the network that are part of the MDT, the control plane device comprising:
a non-transitory machine-readable medium to store a sub-tree computation module; and
a processor coupled to the non-transitory machine-readable medium to execute the sub-tree computation module, the processor configured to select a next sub-tree in the set of sub-trees in the MDT, the selected sub-tree rooted at a current node within the MDT, to compute the selected sub-tree by identifying specific hops that are unspecified from a root of the selected sub-tree to leaves, and to generate a translation of sub-tree identifiers between the sub-tree identifiers of the selected sub-tree and a sub-tree identifier of an upstream sub-tree, in response to a computing node determining that the computing node is configuring the current node and the sub-tree root of the selected sub-tree, and in response to the computing node determining that there is an upstream sub-tree for the current node, wherein the determining that there is an upstream sub-tree for the current node, is performed after the determining that the computing node is configuring the current node and the sub-tree root of the selected sub-tree.

19. The control plane device of claim 18, wherein the loosely specified MDT does not specify each hop of the MDT and includes at least one waypoint on a path between a root and at least one leaf of the MDT, where the path includes unspecified hops and the at least one waypoint is an intermediate node that is specified within the unspecified hops.

20. The control plane device of claim 18, wherein the processor is further configured to install state to reach leaves or replication nodes in the selected sub-tree.

21. The control plane device of claim 18, wherein each of the global identifiers are labels, and the translation is a cross-connect of the labels between the selected sub-tree and the upstream sub-tree.

22. The control plane device of claim 18, wherein the loosely specified MDT is defined in a multi-protocol label switching (MPLS) or source packet routing in networking (SPRING) segment routing instantiation.

* * * * *